(12) United States Patent
Lübker et al.

(10) Patent No.: US 11,976,630 B2
(45) Date of Patent: May 7, 2024

(54) RELATIVE ROTOR BLADE MISALIGNMENT

(71) Applicant: Ventus Engineering GmbH, Vienna (AT)

(72) Inventors: Poul Anker Skaarup Lübker, Baar (CH); Shavkat Mingaliev, Vienna (AT); Xavier Tolron, Vienna (AT)

(73) Assignee: Ventus Engineering GmbH, Vienna (AT)

( * ) Notice: Subject to any disclaimer, the term of this patent is extended or adjusted under 35 U.S.C. 154(b) by 173 days.

(21) Appl. No.: 17/438,403

(22) PCT Filed: Mar. 10, 2020

(86) PCT No.: PCT/EP2020/056337
§ 371 (c)(1),
(2) Date: Sep. 10, 2021

(87) PCT Pub. No.: WO2020/182806
PCT Pub. Date: Sep. 17, 2020

(65) Prior Publication Data
US 2022/0145854 A1 May 12, 2022

(30) Foreign Application Priority Data
Mar. 11, 2019 (EP) .................................. 19161934

(51) Int. Cl.
*F03D 7/02* (2006.01)
*F03D 17/00* (2016.01)

(52) U.S. Cl.
CPC ........... *F03D 7/0224* (2013.01); *F03D 17/00* (2016.05); *F05B 2270/328* (2013.01); *F05B 2270/802* (2013.01)

(58) Field of Classification Search
CPC ........ F03D 17/00; F03D 7/022; F03D 7/0224; F05B 2270/802; F05B 2270/328; Y02E 10/72
See application file for complete search history.

(56) References Cited

U.S. PATENT DOCUMENTS

| | | | | |
|---|---|---|---|---|
| 4,738,590 A | * | 4/1988 | Butler | B64C 11/32 416/129 |
| 5,174,718 A | * | 12/1992 | Lampeter | B64C 11/38 416/157 R |
| 7,118,339 B2 | * | 10/2006 | Moroz | F03D 7/0292 416/9 |

(Continued)

FOREIGN PATENT DOCUMENTS

| | | |
|---|---|---|
| CN | 101476961 A | 7/2009 |
| CN | 102338034 A | 2/2012 |
| EP | 2615303 A1 | 7/2013 |

OTHER PUBLICATIONS

China National Intellectual Property Administration; Examination Report issued in counterpart application CN 202080034817.4; dated Jul. 29, 2023.

*Primary Examiner* — Igor Kershteyn
(74) *Attorney, Agent, or Firm* — Dykema Gossett PLLC

(57) ABSTRACT

Disclosed is a method of monitoring relative blade pitch angle alignment of a set of at least two rotor blades in a rotary device. The rotary device may be a wind turbine generator. Also disclosed are operational schemes based on the observed relative blade pitch angle alignments.

14 Claims, 15 Drawing Sheets

(56) References Cited

U.S. PATENT DOCUMENTS

| | | | | |
|---|---|---|---|---|
| 7,160,083 B2* | 1/2007 | Pierce | ............... | F03D 17/00 |
| | | | | 416/61 |
| 7,437,264 B2* | 10/2008 | Pierce | ............... | F03D 7/024 |
| | | | | 702/151 |
| 8,360,722 B2 | 1/2013 | Hoffmann et al. | | |
| 2009/0129924 A1* | 5/2009 | Rebsdorf | ............... | F03D 17/00 |
| | | | | 416/43 |
| 2009/0129925 A1* | 5/2009 | Vronsky | ............... | G01L 5/0004 |
| | | | | 416/61 |
| 2013/0183151 A1 | 7/2013 | Álvaro et al. | | |
| 2015/0086362 A1 | 3/2015 | Fu et al. | | |

* cited by examiner

A:

B:

$\Delta\phi_{ij} = \phi_i - \phi_j = 0$ $\Delta\phi_{ij} = \phi_i - \phi_j = 0$

C:

D:

$\Delta\phi_{ij} = \phi_i - \phi_j \neq 0$ $\Delta\phi_{ij} = \phi_i - \phi_j \neq 0$

RELATIVE ROTOR BLADE MISALIGNMENT

CROSS-REFERENCE TO RELATED APPLICATIONS

This application is a national stage filing based upon International PCT application no. PCT/EP2020/056337, filed 10 Mar. 2020, which claims the benefit of priority to Europe application no. 19161934.5, filed 11 Mar. 2019.

FIELD OF THE INVENTION

Disclosed is a method of monitoring relative blade pitch angle alignment of a set of at least two rotor blades in a rotary device. The rotary device may be a wind turbine generator. Also disclosed are operational schemes based on the observed relative blade pitch angle alignments.

BACKGROUND OF THE INVENTION

The performance of rotary devices with blades depends on the status or condition of the blades. A blade may be pitched or be in a pitch angle. Such pitching or pitch angle position may be in alignment as expected or there may be a discrepancy or misalignment. Such misalignment, difference of discrepancy may be an absolute value for an individual blade. As such there is an absolute misalignment. The misalignment, difference or discrepancy may be between two blades. As such there is a relative misalignment.

Pitch blade alignment or misalignment is an area of technical importance to any rotary device with blades. A blade may have an overall performance or efficiency, which depends on the alignment or misalignment. The overall performance of such a rotary device may lead to a rotary device in-efficiency, underperformance or imbalance, which is also of technical importance.

In example a wind turbine generator may be such rotary device. In that technical field the pitch blade misalignment relates to the misalignment of pitch of the rotor blades of the wind turbine.

A wind turbine rotor blade may be characterised by an aerodynamic efficiency that is strongly correlated with blade alignment or misalignment.

An overall performance of the rotor may be characterised as or dependent on a rotor aerodynamic efficiency. An overall performance of the rotor may be characterised by or be dependent on an aerodynamic imbalance.

As such and exemplified by wind turbines, there is a specific pitch angle for any given wind speed to optimize output power.

Pitch angles greater or less than this specific value will reduce power output, even to the point of zero rotation with high winds.

Blade pitches are typically in a fixed position from cut in wind speed up to the point where the WTG reaches its performance peak/rated power output.

Changes in blade pitch typically start when the wind speed reaches 12 to 13 m/sec (27 to 29 mph), the point where the turbine reaches its performance peak. If the wind starts to exceed that level, the pitch-control systems kick in to reduce the blade angle of attack, taking a lower percentage of energy from the wind but keeping the generator near 100% of power output without over speeding.

When the wind speed reaches 25 m/sec (50 mph) or higher, the pitch-control system fail-saves the blades in a manner that reduces wind loadings and stops the turbine rotor from turning.

OBJECT OF THE INVENTION

It is an object of this invention to improve the assessment of relative blade pitch angle alignment on a rotary device. It is a further objective to improve operation of the rotary device based on relative blade pitch alignment information.

It is an object of this invention to improve the assessment of relative blade pitch angle alignment on a wind turbine generator; and to improve operation of the wind turbine generator based on relative blade pitch alignment information.

DESCRIPTION OF THE INVENTION

An object is achieved by a method of monitoring relative blade pitch angle alignment of a set of at least two rotor blades in a rotary device.

There may be the following acts.

There is an act of collecting one or more dataset from a set of one or more blade sensors configured to sense at least two rotor blades.

There is an act of calibrating one blade sensor from one set of blade sensors against at least one blade sensor from another set of blade sensors.

There is an act of calculating a calibration correction factor for the blade sensors.

There is an act of applying the calibration correction factor to each respective data sets.

There is an act of classifying the relative blade pitch angle alignment between the pitch angles of at least one combination of rotor blades in the set of least two rotor blades.

There may be an act of providing a timestamp to each data set. Such act will enable time synchronizing data sets from the different sensors.

A blade sensor may be a sensor node, which comprises one or more sensory devices, means for powering the sensor node, means for time stamping and storing sensory output, means for processing sensory output and means for communicating the sensory output to one or more sensory output collection devices. A sensor node may have a microprocessor monitoring the operation of the sensor node, process the sensory output and provide a trigger mechanism controlling the sensor(s) sampling frequency and storage of sensory output feasible for communicating. A sensor may be a single sensory device or a multiple sensory device. A sensor or sensor node may be used interchangeably and a person skilled in the art would know how to build on the descriptions of a sensor or sensor node presented herein.

The blade sensor will generate, and optionally, time stamp data in a dataset for that specific blade. Thus one blade sensor may generate a blade dataset. There may also be a collection of blade sensors a set of blade sensors that generate a blade dataset.

A sensor may comprise a tri-axial (3 axes) which sensor may be applied to rotary devices comparable to the individual blades in rotors of wind turbine generators.

In an aspect the acts of collecting and calibrating are performed with the rotary device in a state of stand-still, i.e. static state, and wherein the act applying the static calibration installation correction factor is performed on relative dynamic blade pitch misalignment from the rotary device in a stand-still position compared to when the rotary device is in an operational position, i.e. dynamic state.

In an optional aspect there is the act of collecting time stamped sensory output for calibration of the sensors which is performed with the rotary device in a state of standstill.

These static installation correction factor calculations of the sensors when being installed in the blades are necessary in order to be able to apply an individual installation correction factor to the sensory output from the individual blades to conclude the relative blade pitch angle misalignment while the wind turbine is in operation.

In an aspect there is an act of collecting datasets performed as timestamped data and wherein the method further comprises an act of synchronizing the collected datasets according to the timestamps.

Timestamps may be provided by a local clock. Time stamps may be provided by a global clock. The timestamps may be applied a central processor or distributed to be applied at sensor level. Synchronization is advantageous since synchronization improves assessments and may allow refined models, data or higher quality data to be applied in a corrective manner to say lower quality or less frequently sampled data.

In an aspect, an act of calibrating is performed against at least one other sensor from the rotary device.

This act of calibration is advantageous in order to be able to apply a correction factor to the operating results of the relative blades pitch calculation results while the wind turbine is in operation. This calibration factor will compensate for any static installation error of the sensors in the blades and is necessary in order to apply a correction factor to the operating results of the relative blade pitch calculation results while the wind turbine is in operation.

There may be a high quality sensor with very reliable data or a model producing very reliable data or verified data. The act of calibration may involve calibration against or with reference to such high quality sensor or model. Thereby further increasing reliability and quality of the measures.

This act of calibration up against a high quality sensor or model is advantageous in order to be able to apply a correction factor to the operating results of the relative blades pitch calculation results while the wind turbine is in operation. This calibration factor will compensate for any differences in between the individual sensors.

In an aspect the act of collecting is performed with blade sensors arranged substantially identical on the respective rotor blades.

Physically sensors cannot be arranged 100% identically, but the starting point is that sensors are arranged substantially identical or as identical as possible. The installation may need an act of calibrating. That is a calibration procedure when the rotor is in stand-still to identify inaccuracy in the installation of the sensors and by this calibration establish a correction factor compensating for this inaccuracy in the installation.

Installations of sensors arranged identically, in the sense of as identical as possible, may further increase the quality of assessment of the relative blade pitch misalignment area.

In an aspect acts are performed on the rotary device comprising three rotor blades (A, B, C), and wherein the act of collecting is performed collecting an A-dataset during a time period where the rotary device is in an operational state of stand-still with rotor blade A in a predefined position P. There may be an act of collecting a B-dataset where the rotary device is in an operational state of stand-still with rotor blade B in the predefined position P. There may be an act of collecting a C-dataset where the rotary device is in an operational state of stand-still with rotor blade C in a predefined position P.

For a rotor with two blades there may acts as described, but only on A and B. For a rotor with more blades there may be acts as described for blades amongst which a relative blade pitch angle is to be established.

In an aspect an act of calibrating is performed only based on the collected A-, B-, and C-datasets.

This act of calibration is advantageous in order to be able to apply a correction factor to the operating results of the relative blades pitch calculation results while the wind turbine is in operation. This calibration factor will compensate for any static installation error of the sensors in the blades and is necessary in order to apply a correction factor to the operating results of the relative blade pitch calculation results while the wind turbine is in operation.

In an aspect there is an act of classifying is performed in different states of rotor device operational states including at least the states of: a state of stand-still and a state of rotating. At stand-still the rotor has an RPM of zero (RPM=0). In the state of rotating the rotor has a RPM>0. Making the classification during the different states, the method allows for determination of relative static blade pitch a In an aspect there is an act of classifying is performed different states of rotor device operational states different RPMs.

The rotor may cover a swept area and the swept area may be divided into sections. Assessments may be made based on data collected from those sections. Assessments may be made for the individual blades in such sections. Assessments may be made for the overall rotor performance based on such sections. Likewise classifications may be based on sections.

Thus a rotary device may be monitored or operated according to specific conditions or tolerances in individual sectors.

This act of monitoring the individual blades in the individual sectors is advantageous in order to be able to compare the accumulated sensory output from the individual blades while operating in the individual sectors hence the performance of the individual blades and the overall rotor can be evaluated.

In an aspect the rotary device is a rotor of a wind turbine generator (WTG) and the rotor blades are of the wind turbine generator (WTG).

Wind turbines generators may benefit from the assessments and operations suggested here, since wind turbine generators must perform under different conditions and over long periods of time. Wind turbine generators further require occasional maintenance and monitoring, as suggested, may then be used as corrective measures during such planned maintenance and during operation. Furthermore instant alerts may be generated and instant corrections may be applied.

This act of monitoring the performance of the individual blades and the overall rotor is advantageous in order to be able to compare the performance of the individual blades on a specific rotor and compare the performance from the individual blades on specific rotor with the performance from individual blades on similar rotors. Based on this, the performance from the individual rotors can be optimized. Furthermore, based on this comparison, instant alerts may be generated and corrections may be applied instantly by the wind turbine controller or at the next service visit to the wind turbine.

In an aspect there are further acts to monitor and classify aerodynamic efficiency and to classify into relative blade aerodynamic efficiencies between at least one combination in the set of at least two rotor blades.

To achieve rotor aerodynamic balance, according to the methods and systems outlined enabling adjustment of all blades to the same pitch angle, this may be performed, assuming no individual damages, same twisting and bending etc.

To achieve the maximum rotor efficiency, adjusting all (three) blades into the most efficient pitch angle, in the case of a WTG, this may be in the range from cut in wind speed up to rated power wind speed.

Although this is not mandatory according to the outlined acts, then optionally it may be advantageous for one blade to define the most efficient blade pitch angel—to adjust all (three) blades into this optimal blade pitch angle.

In the case of a WTG, this may not only achieve aerodynamic rotor balance, but also maximize the power output from cut in to rated power and therefore maximize total power output.

An object may be achieved by operating a rotary device comprising the acts of providing the rotary device and monitoring relative blade pitch angle alignment of the rotary device according to the previously outlined acts. Then operating the rotary device as a function of the classified relative pitch angle alignment.

The acts of optimizing aerodynamic efficiency will be exemplified.

It is to be observed that it is not only a matter of how close to zero relative dynamic blade pitch misalignment is, but also a matter of adjusting all three blades to the most efficient (normally fixed) pitch angle from cut in wind speed up to rated power where the pitch mechanism starts to reduce power.

There may be an act of determining which pitch angle is the most efficient in between cut in wind speed and from cut in wind speed up to the point where the WTG reaches peak performance/rated power out-put. This can be seen in the data from sensors, which pitch angle results in the highest acceleration.

There may be an act of adjusting all three blades pitches into this same angle position while the rotor is in operation.

There is an act of defining the most efficient pitch angle in wind speeds in between cut in wind speed up to the point where the WTG reaches peak performance/rated power out-put.

In an aspect the rotary device is a wind turbine generator (WTG) and wherein the act of operating the rotary device is performed in a corrected mode of operation if the monitored relative blade pitch angle alignment is at or above a threshold value.

In an aspect there is an act of monitoring and classifying further comprising acts of monitoring and classifying relative differences in blade aerodynamic efficiencies between at least one combination in the set of at least two rotor blades; and wherein the act of operating further comprises operating the rotary device as a function of the classified relative aerodynamic efficiency.

A further act is to monitor and classify the relative differences in the aerodynamic efficiency in between the blades and algorithms will then trigger different alarm modes/signals when unusual events are detected.

An objective is achieved by a blade pitch angle alignment monitoring system comprising a set of one or more blade sensors and computational means configured to perform the acts as described above.

An objective is achieved by a computer program product comprising instructions to cause the computational means such as a computer or a controller to perform the acts as described.

An objective is achieved by computer-readable medium having stored there on the computer program described.

EXAMPLES

In the following there are examples of relative blade pitch angle misalignment measurement using accelerometer data from sensors located inside/on wind turbine blades.

A typical use may be of acceleration data of 3-axis accelerometers placed as identically as possible in all three blades of a same wind turbine generator.

The dominant axis will be defined as the accelerometer axis which is along the blade. The two other axes will be used to find the blade orientations.

As a first Method example:

Relative blade pitch angle misalignment detection Using Rotation Matrices and Euler angles.

First Alternative with a Dominant Axis

Between two 3D vectors (x, y, z), it is possible to calculate a 3D rotation matrix (3×3) that will define the transformation necessary from one vector to another.

From this transformation matrix, Euler angles can be determined. Euler angles are the angle values necessary on all three axes to define the rotation between the two vectors.

A person skilled in the art will find amble examples of calculations of Euler angles.

In an orthonormal basis (x, y and z), these angles are defined as $\varphi$ (rotation around x, roll), $\theta$ (rotation around y, pitch) and $\psi$ (rotation around z, yaw).

The following acts are used in the first method:

Data is filtered with a low pass filter in order to filter out the noise and keep only the high fluctuations of the acceleration data: the blade movements.

There is an act of calculating n-rotation matrices over a pre-defined number n of iterations, depending on the amount of data used, using an origin vector and a target vector. These two vectors will both change at each iteration, but the time interval between an origin vector and a target vector is always the same. With the next iteration, the target vector becomes the origin vector.

There is an act of extracting the mean rotation matrix of all these n rotation matrices calculated. The result is the Euler angle around the dominant channel of the final rotation matrix.

Adjustments may be needed in order to properly define the axis for generating a rotation matrix that can be relied upon for the extraction of Euler angles.

Second Alternative—without a Dominant Axis

This second alternative is almost the same as the first alternative.

The difference is that the calculation of the rotation matrix at each iteration is made with the dominant channel equal to zero (0). This means that only the change of values of the two other axes of interest will be calculated in this matrix.

A Second Method Example Pitch Misalignment Detection—Using Roll Formula

For all three sensors A, B, C, each placed in respective blades A, B, C, if for example the dominant channel is Z, it is possible to calculate for all values in channel X and channel Y the roll angle.

Prior to this calculation, the data was low-pass filtered.

With reference to FIG. 13, the results are given in degrees as:

FIG. 13A roll(A)=A TAN 2(Y(A), X(A))
FIG. 13B roll(B)=A TAN 2(Y(B), X(B))
FIG. 13C roll(C)=A TAN 2(Y(C), X(C))

FIG. 13 shows the roll angle calculations of the two axes of interest (i.e: the two axes other than the dominant axis), over one minute. We can see through this example that the roll angles measured in Blade A and C are within the same minimum and maximum angle ranges. On the other hand, the roll angle measured in Blade B shows roll values shifted up. This difference of angles ranges is subtracted to one another in order to get relative values.

FIGS. 13A, 13B and 13C shows Pitch misalignment detection—Using Roll formula for three sensors A, B, C located in three blades. If for example the dominant channel is z, we calculate for all values in channel x and channel y the Roll angle. Prior to this calculation, the data was low pass filtered.

First Alternative—Using Roll Formula and Using Min/Max

From the above three sets of roll data, the following calculations are performed:

$AB_{min}$=ABS(ABS(MIN(ROLL(A))−ABS(MIN(ROLL(B)))))

$AB_{max}$=ABS(ABS(MAX(ROLL(A))−ABS(MAX(ROLL(B)))))

$AC_{min}$=AB S(AB S(MIN(ROLL(A))−AB S(MIN(ROLL(C)))))

$AC_{max}$=ABS(ABS(MAX(ROLL(A))−ABS(MAX(ROLL(C)))))

$BC_{min}$=ABS(ABS(MIN(ROLL(B))−ABS(MIN(ROLL(C)))))

$BC_{max}$=ABS(ABS(MAX(ROLL(B))−ABS(MAX(ROLL(C)))))

Confidence intervals of minimum and maximum values measured between two blades are obtained.

Second alternative—using roll formula–using $50_{min}$ values/$50_{Max}$ values

This second alternative provides more precision than the first one. The fluctuations seen in FIG. 13A-C would lead to errors. Instead of taking one value for min and one value for max, a mean of e.g. the 50 smallest values recorded and the mean of the 50 greatest values recorded are taken for each roll calculation.

The alternative may be expressed as:

$AB_{min}$=ABS(MIN(MEAN(50_min_val_ROLL(A))−ABS(MIN(MEAN (50_min_val_ROLL(B))))

$AB_{max}$=ABS(MAX(MEAN(50_max_val_ROLL(A))−ABS(MAX (MEAN(50_max_val_ROLL(B))))

$AC_{min}$=ABS(MIN(MEAN(50_min_val_ROLL(A))−ABS(MIN(MEAN (50_min_val_ROLL(C))))

$AC_{max}$=ABS(MAX(MEAN(50_max_val_ROLL(A))−ABS(MAX (MEAN(50_max_val_ROLL(C))))

$BC_{min}$=ABS(MIN(MEAN(50_min_val_ROLL(A))−ABS(MIN(MEAN (50_min_val _ROLL(C))))

$BC_{max}$=ABS(MAX(MEAN(50_max_val _ROLL(A))−ABS(MAX (MEAN(50_max_val _ROLL(C))))

With this alternative, confidence intervals of minimum and maximum values as measured between two blades are obtained.

A Third Method Example Pitch Misalignment Detection—Using Fitting Ellipse

This method uses raw data, no pre-processing is done. There may be acts as follows (see FIGS. 14 A and B):

For each sensor, the two axes of interest (other than the dominant axis, which is the 3rd axis along the blade) are used to find a fitting ellipse from the collected data.

From this fitting ellipse the two most distant points are taken.

From the coordinates of these two most distant points the slope value is calculated.

Having a slope value for all three sensors, we can calculate the angles between these slopes and find the relative angle between two sensor data sets, i.e. two blade orientations.

In the plots shown in FIGS. 14A and 14B are illustrations of this example, plotting acceleration data of two sensors of a same turbine. The two acceleration channels X and Y of interest (the two channels other than the dominant channel Z) are plotted against each other in dots (blue), the fitting ellipse of these blue dots is the full line ellipse (red); and the two most distant points of this ellipse are solid dots (black).

The length of the major and minor axis of this fitting ellipse could also be used to calculate the orientation and position of the sensor. For instance, the ratio between the major axis length and the minor axis length gives an indication of the sensor position. The major axis of an ellipse is its longest diameter, whereas the minor axis of an ellipse is its shortest diameter It is observed that for this method a two-axis accelerometer could be used since only two axes are used.

In FIG. 14A and FIG. 14B are displaying plot examples of two sensors located in two blades of the same turbine. The two plots each show the two axes of interest which is plotted in blue, the fitting ellipse is in red and the two most distance points are in black.

Regarding Calibration/Correction:

In the examples mentioned, installation process and error angle evaluation is of importance. The sensors must be mounted in the three blades as identically as possible. It is not possible to rely on this postulate to believe in the results presented in the previous sections. Thus calculating the initial installation angles of the sensors in the blades and comparing them from one sensor to another will improve the results.

These calculated correction angles will be used together with the collected data from the sensors in order to assume that the sensors are mounted with the same angles. Therefore it can be assumed that the results of the algorithms are valid.

An accelerometer measures acceleration and the gravitational force (1g) and how it is split on all three channels of the sensor. This split gives the orientation of the sensor.

The main idea consists in measuring the accelerations with all three sensors in the blades at stand-still position and, based on this, calculating the differences in installation angles.

For practical reasons, the acquisition of the calibration data is done during the installation of the sensors, when the technicians are operating on the turbine. The acquisition of the calibration data could, of course, also be done independently from the sensor installation.

First Method of Calibration/Correction of Initial Stand-Still Data Acquisition with One or Two Rotor Turns During Installation If the wind turbine generator that is to be inspected has stopped all three blades at the exact same position, this is the preferred method of calibration data acquisition.

The process may comprise acts as follows:
blocking the turbine with one blade facing straight down;
installing the first sensor with the predefined dominant channel and distance from the centre along a blade other than the one facing down;

This is the timestamp where the data of the first sensor in the first blade will be used as calibration data;
turning the rotor by a ⅓ rotation for the second blade to reach the position in which the second installation will be made; to match as accurately as possible, the optimal position is where the first blade was before rotation;
installing the second sensor with the same predefined dominant channel along the second blade;

This is the timestamp where the data of the second sensor in the second blade will be used as calibration data;
turning the rotor by a ⅓ rotation for the third blade to reach the position in which the third installation will be made; to reproduce as accurately as possible, the optimal position is where the first and second blades were before rotations;
installing the third sensor with the same predefined dominant channel along the blade;

This is the timestamp where the data of the third sensor in the third blade will be used as calibration data.

First Method of Installation—Correction Angle Calculations

The first method of installation comprises a process with acts:
after the installation of the sensors in the blades, retrieving the timestamps with the corresponding known positions of the blades;
extracting one minute of data of all the accelerations at these stand still positions and averaging them channel by channel in order to obtain a mean value of position over time (one value for each channel of each sensor);
calculating rotation matrices between these averaged sensor data. Three sensors give three 3D vectors and therefore three rotation matrices;
extracting the Euler angle around the dominant axis to achieve the initial sensor angle error;
this sensor angle error is used as the initial condition (error angle due to installation);
these error-angles will be subtracted or added accordingly to the end results of the methods presented above.

Second Method of Calibration/Correction of Initial Stand-Still with No Rotor Turns During Installation If it is not possible to stop all three blades at the exact same position when inspecting the wind turbine generator, this is a method of calibration data acquisition that can be used instead. This is the worst-case scenario in regard to calibration data acquisition. This method differs from the first method (correction angle calculations) since it uses an act of comparing the measured values with the theoretical values expected. This method is still reliable, but may generate more error than the first method.

The second method of calibration/correction of initial stand-still comprises a process with acts:
blocking the turbine with one blade facing straight down;
installing all three sensors in this rotor position, the same way for the three blades: same dominant axis along the blades and same distance from the rotor centre.

This is the timestamp where the data of all three sensors in the three blades will be used as calibration data.

Second Installation Method—Correction-Angle Calculations

In this case, the theoretical positions of the sensors are known, and these theoretical acceleration values may be used to build the rotation matrices with the real accelerations.

It is assumed that the dominant channel of the sensor is z, the third one, and the blade facing down is a. The theoretical acceleration vectors that should be measured at this stand-still position are:

A—blade facing down, dominant channel taking measurements of all the acceleration
B—blade facing right, (blade has a 30° angle with the horizontal plane)
C—blade facing left, (blade has a 150° angle with the horizontal plane)

For the reference coordinate system then:

$\cos(30)=0.866, \sin(30)=0.5, \cos(150)=-0.866, \sin(150)=0.5$.

As an example, here are the accelerations measured with this type of calibration data:
$A_{theo}$: [0, 0, −1]
$B_{theo}$: [0.8660, 0, 0.5]
$C_{theo}$: [−0.8660, 0, 0.5]
A: [0.0309, −0.0971, −0.9936]
B: [0.8647, 0.0251, 0.4899]
C: [−0.8606, 0.0171, 0.5020]

The acceleration of the gravitational force is measured in $m/s^2$.

The second method of installation comprises a process with acts:
after the installation of the sensors in the blades, retrieving the timestamps with the corresponding known positions of the blades;
extracting one minute of data of all the accelerations at these stands still positions and averaging them channel by channel in order to have a mean value of position over time (one value for each channel of each sensor);
calculating rotation matrices between these averaged sensor data and the theoretical data. Three sensors give three 3D vectors and therefore three rotation matrices;
extracting the Euler angle around the dominant axis gives the relative blade pitch misalignment, in comparison with the expected theoretical value;
comparing angle values between blades to achieve the initial sensor angle error;
this sensor angle error is used as the initial condition (error angle due to installation);

These angles will be subtracted or added accordingly to the end results of the methods presented above.

Presentation of Method Results

In the following there is a presentation of relative blade pitch angle misalignment in between three blades (blade A, B and C) measurement results.

Result; example for a three blade wind turbine:

| B (Ellipse method) | C | D = B − C |
|---|---|---|
| Δ (A, B): −0.593° | Δ (A, B): 0.089° | Δ (A, B): −0.683° |
| Δ (A, C): −4.187° | Δ (A, C): −3.223° | Δ (A, C): −0.963° |
| Δ (B, C): −3.593° | Δ (B, C): −3.001° | Δ (B, C): −0.591° |

Several methods could be used to obtain these relative blade pitch angle misalignments in between the results of the three blades (blades A, B and C). Two additional methods have been presented in this document (using rotation matrices and roll formulas), but several other methods could also be used.

A further correction may be performed to obtain a relative dynamic blade pitch misalignment from the rotor in standstill position compared to when the rotor is in an operational position.

To get the actual total relative blade pitch misalignment in between the individual blades while the rotor is in operation, there is an act of adding to (correcting) the result (D) from the ellipse method any static relative blade pitch misalignment measured while the rotor is in still-stand (A).

The correction may be performed as show in the table below:

One option is a pitch angle according to a theoretical approach. Another option is that the pitch angle is equal to the pitch angle of the most efficient wind turbine in the wind farm.

According to the above exemplified acts and procedures to obtain information about misalignment, an alternative and improved method is to apply the gained information about misalignment to the information by measuring the aerodynamic efficiency on the blades and the rotor while in operation and apply those measurements to actual improved operation.

Assuming that there is no blade damage and there still is an imbalance in the monitored individual blade aerodynamic efficiency, then this will be due to a structural difference between the blades, such as e.g. bending, twisting and weight. A final finetuning of relative blade pitch in operation

| A | B | C | D = B − C | E = A + D |
|---|---|---|---|---|
| Static relative blade pitch misalignment measured at still-standing rotor: synchronization recommended to get correct total result (E) → measurement done at the same timestamp per the specific blade as we measure the individual sensor installation error angle (C) | Ellipse Method | Relative dynamic blade pitch misalignment from rotor is in still-stand position compared to when rotor is in operational position. Individual sensor installation error angle measured at still-standing rotor: synchronization recommended to get correct total result (E) → calibration done at the same timestamp per specific blade since the measurement is the static relative blade pitch misalignment (A) | This is the relative dynamic blade pitch misalignment from the rotor in stand-still position compared to when the rotor is in an operational position | The relative blade pitch misalignment between the individual blades while the rotor is in operation |
| Δ (X, Y): +1.593°<br>Δ (A, C): −2.187°<br>Δ (B, C): +5.593° | Δ (A, B): −0.593°<br>Δ (A, C): −4.187°<br>Δ (B, C): −3.593° | Δ (A, B): 0.089°<br>Δ (A, C): −3.223°<br>Δ (B, C): −3.001° | Δ (A, B): −0.683°<br>Δ (A, C): −0.963°<br>Δ (B, C): −0.591° | Δ (A, B): +0.910°<br>Δ (A, C): −3.150°<br>Δ (B, C): +5.002° |

Method of Optimizing Aerodynamic Efficiency

The above-mentioned examples and actions may further be applied to optimize rotor aerodynamic efficiency, reduce loads and following this optimization monitoring the rotor.

In example, acts described in the following may be applied:

Checking blades visually for blade damages (if any major damages are found, they must be repaired);

Measuring relative static blade pitch misalignment while rotor is in stand-still position;

Measuring (monitoring) relative dynamic blade pitch misalignment from the rotor in stand-still position to the rotor in an operational position;

Adjusting the relative dynamic blade pitch angle to the optimal pitch angle during operation and visually verify that corrections are as expected;

To optimize aerodynamic efficiency an important question is obviously which blade pitch angle is the most efficient in-between cut-in wind speed and the rated power where the wind turbine generator starts pitching to reduce to max rated power—and ultimately up to cut-out wind speed?

will correct this issue and the rotor will now operate in an optimal aerodynamic balance mode.

Following this adjustment process, the disclosed acts and systems will allow to monitor for the remaining lifetime of the individual blade and rotor aerodynamic efficiency and in real-time evaluate and provide instant alarm when needed, such as:

blade damage alarm (e.g. lightning damage, missing stall strips, vortex generator and gurney flaps, etc.);

rotor yaw misalignment alarm, in which case there is no need for LiDAR;

blade icing event, blade leading edge erosion alarm;

turbulence intensity alarm;

rotor overspeed alarm;

orientation of the rotor in stopped position alarm; or lightning system grounding passage of pitch bearings and main shaft bearing (monitored once say every hour as required).

The effect of applying the before-mentioned acts to optimize rotor aerodynamic efficiency and optimization is illustrated in FIGS. 15A and 15B, illustrating examples from two pitch-regulated wind turbine generators.

FIG. 15A shows the average blade pitch angle related to the measured average wind speed averaged over a 10 minutes period by the SCADA system in two different wind turbines of the same type (Site 1 and Site 2). Ideally the average blade pitch angles should be similar for the two wind turbines when compared to average wind speed.

FIG. 15B shows the average blade pitch angle related to the measured average rotor speed averaged over a 10 minutes period by the SCADA system in two different wind turbines of the same type (Site 1 and Site 2). Ideally the average blade pitch angles should be similar for the two wind turbines when compared to average rotor speed.

Wind speed versus the desired turbine rpm determines blade pitch. There is a specific pitch angle for any given wind speed to optimize output power. Pitch angles greater or less than this value reduce power output, even to the point of zero rotation with high winds.

Changes in blade pitch typically start when the wind speed reaches 12 to 13 m/sec (27 to 29 mph), the point where the turbine reaches its peak performance. If the wind starts to exceed that level, the pitch-control systems kick in to reduce the blade angle of attack, taking a lower percentage of energy from the wind to keep the generator near 100% output without over speeding.

When the wind speed reaches 25 m/sec (50 mph) or higher, the pitch-control system fail-safes the blades in a manner that reduces wind loading and stops the turbine rotor from turning.

DESCRIPTION OF THE DRAWING

Embodiments of the invention will be described in the figures, whereon.

DETAILED DESCRIPTION OF THE INVENTION

| Item | No |
|---|---|
| Rotary device | 10 |
| Wind Turbine Generator (WTG) | 12 |
| Rotor | 14 |
| Swept area | 16 |
| Rotor sector | 18 |
| Set of rotor blades | 20 |
| Rotor blade/blade | 22 |
| Dataset | 30 |
| Timestamped data | 32 |
| Timestamp | 34 |
| Set of blade sensors | 40 |
| Blade sensor | 42 |
| Pitch alignment monitoring system | 50 |
| Computational means | 60 |
| Controller | 62 |
| Cloud/Connection | 70 |
| Operator System | 74 |
| Mobile device | 76 |
| Client Server | 77 |
| Database/storage | 80 |
| Method of monitoring relative blade pitch angle alignment | 100 |
| Relative blade pitch angle alignment | 102 |
| Pitch angle | 104 |
| Combination of rotor blades | 106 |
| Collecting | 110 |
| Calibrating | 120 |
| Calculating | 130 |
| Applying | 140 |
| Classifying | 150 |
| Relative blade aerodynamic efficiencies | 154 |
| Correction factor | 132 |
| Synchronizing | 160 |
| Method of operating a rotary device | 200 |
| Providing | 210 |
| Operating | 220 |
| Corrected mode of operating | 225 |

Figure 1:
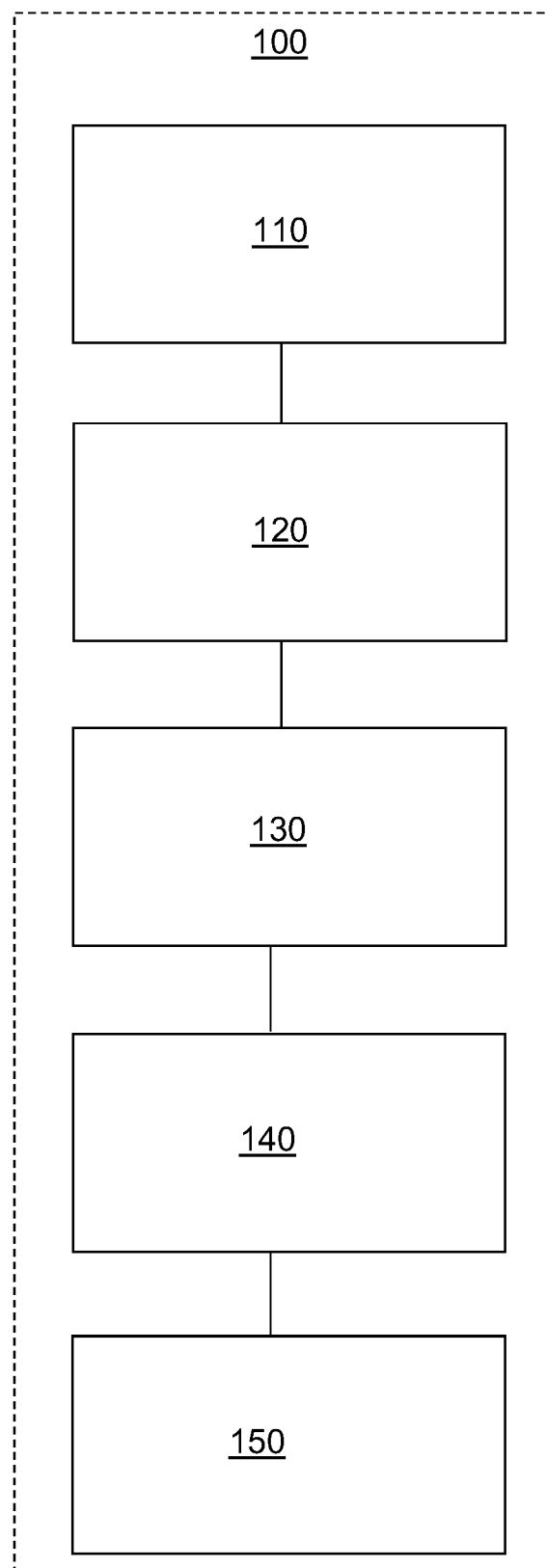
FIG. 1 illustrates a method of monitoring relative pitch angle alignment.

FIG. 1 illustrates a method 100 of monitoring relative pitch angle alignment 102.

Figure 4:
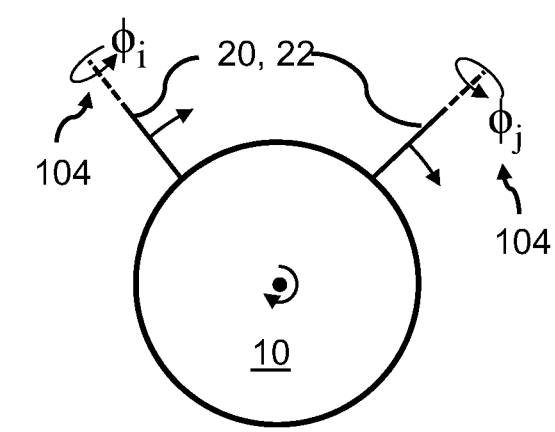
FIG. 4 illustrates definitions of relative pitch angles of a rotary device.
Figure 4:
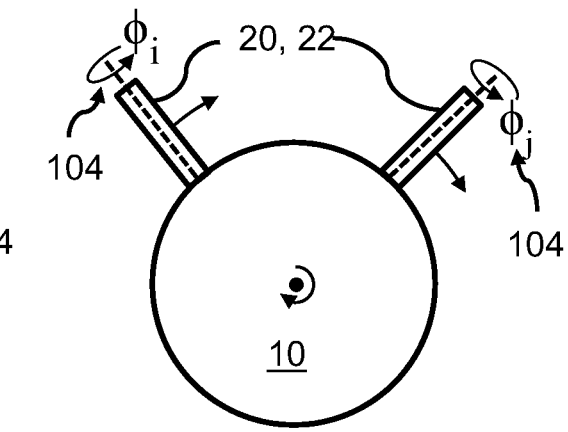
Figure 4:
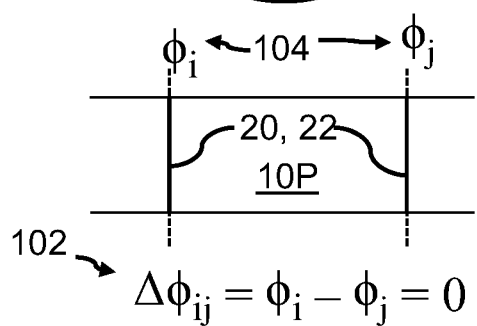
Figure 4:
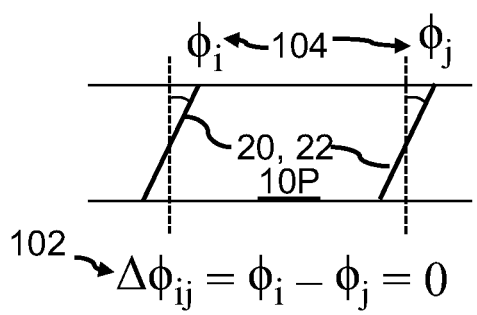
Figure 4:
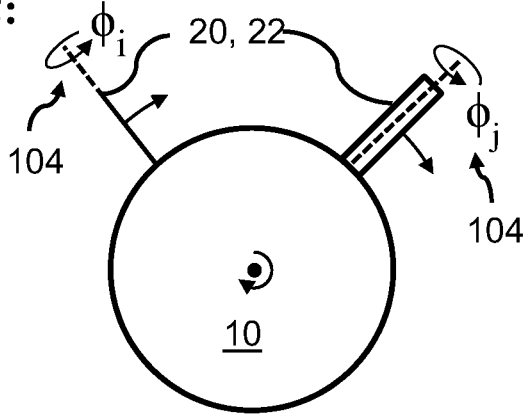
Figure 4:
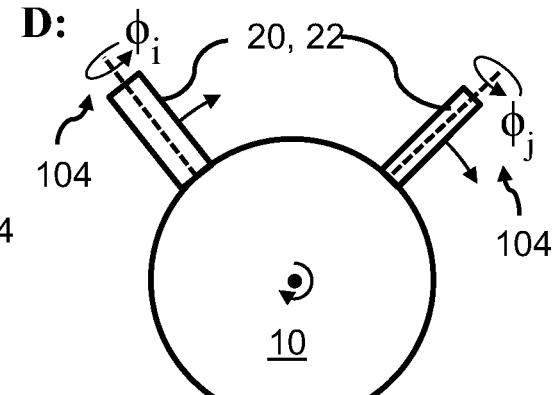
Figure 4:
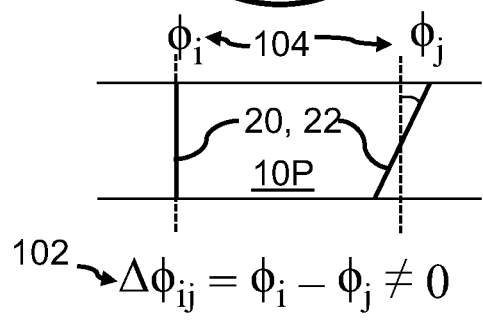
Figure 4:
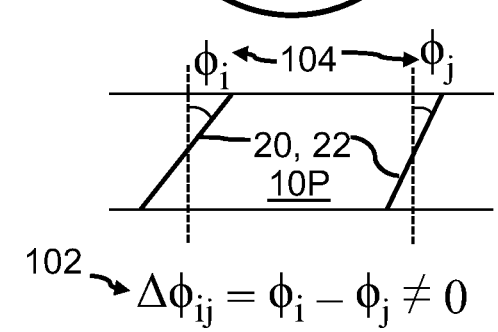
Figure 5:
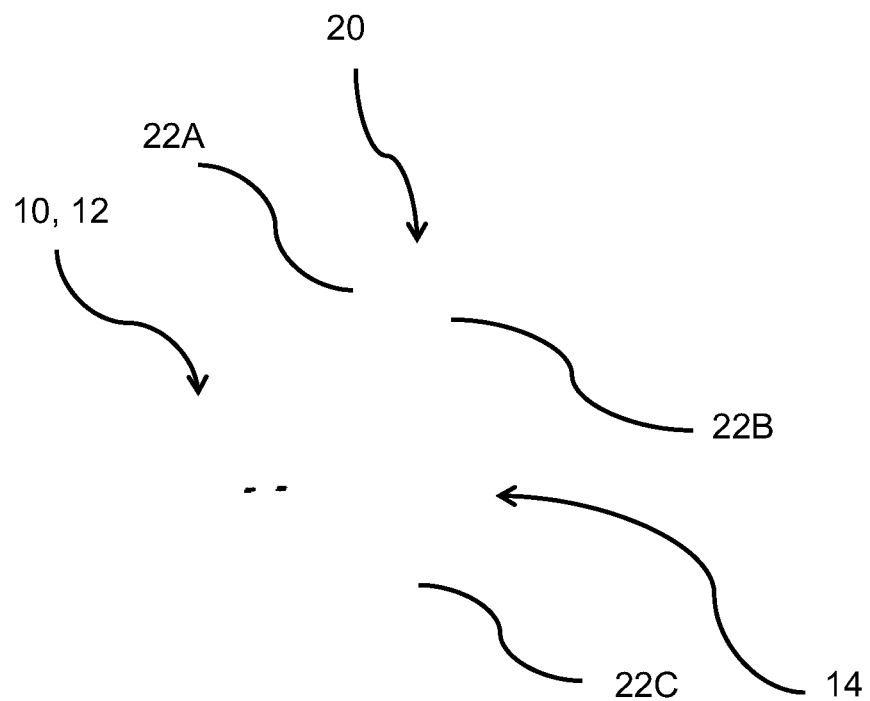
FIG. 5 illustrates a rotary device; in this case a wind turbine generator.
Figure 6:
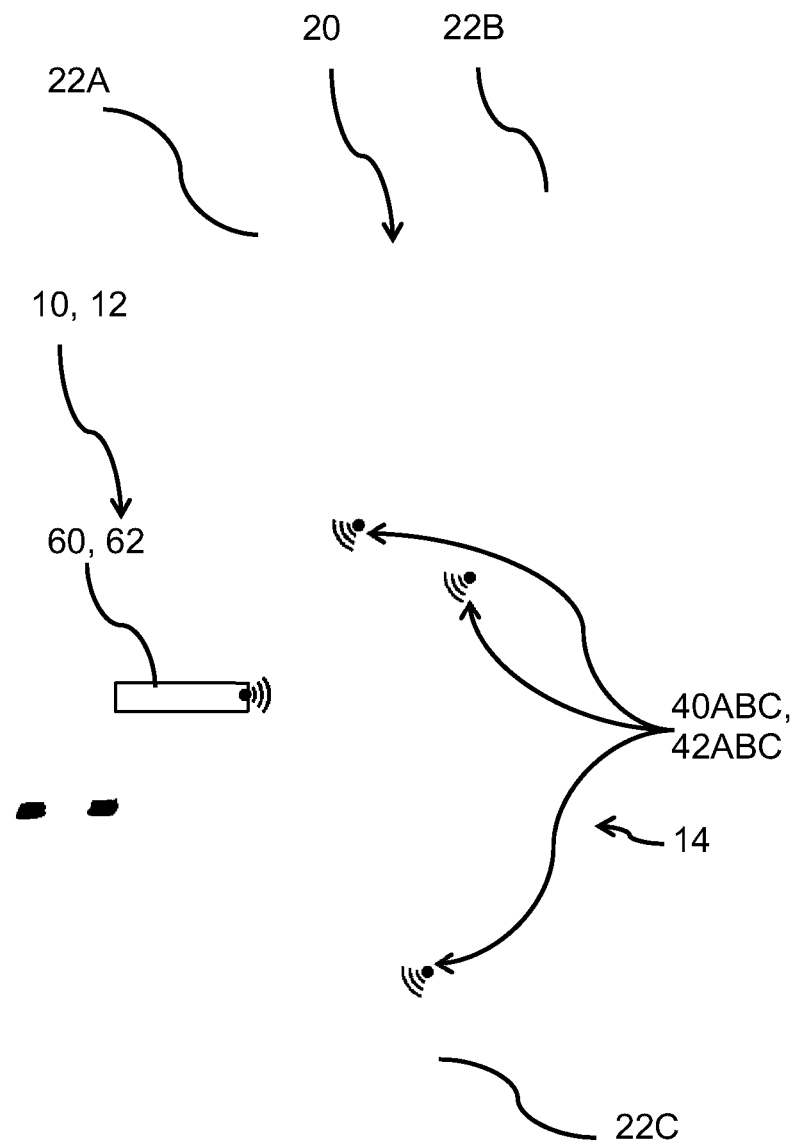
FIG. 6 illustrates a sensory arrangement on blades of a rotary device.

The method 100 of monitoring relative blade pitch angle alignment 102 of a set of 20 at least two rotor blades 22 in a rotary device 10 will be illustrated or exemplified in FIGS. 4 to 6.

The method 100 comprising acts involving:

An act of collecting 110 one or more dataset 30 from a set 40 of one or more blade sensors 42 configured to sense respective least two rotor blades 22.

There is an act of calibrating 120 one blade sensor 42 from one set 40A of blade sensors 42 against at least one blade sensor 42 from another set 40B of blade sensors 42.

There is an act of calculating 130 a calibration correction factor 132 for the blade sensors 42.

There is an act of applying 140 the calibration correction factor 132 to each respective data set 30.

There is an act of classifying 150 the relative blade pitch angle alignment 102 between the pitch angles 104 of at least one combination of rotor blades 106 in the set of least two rotor blades 22.

Figure 2:
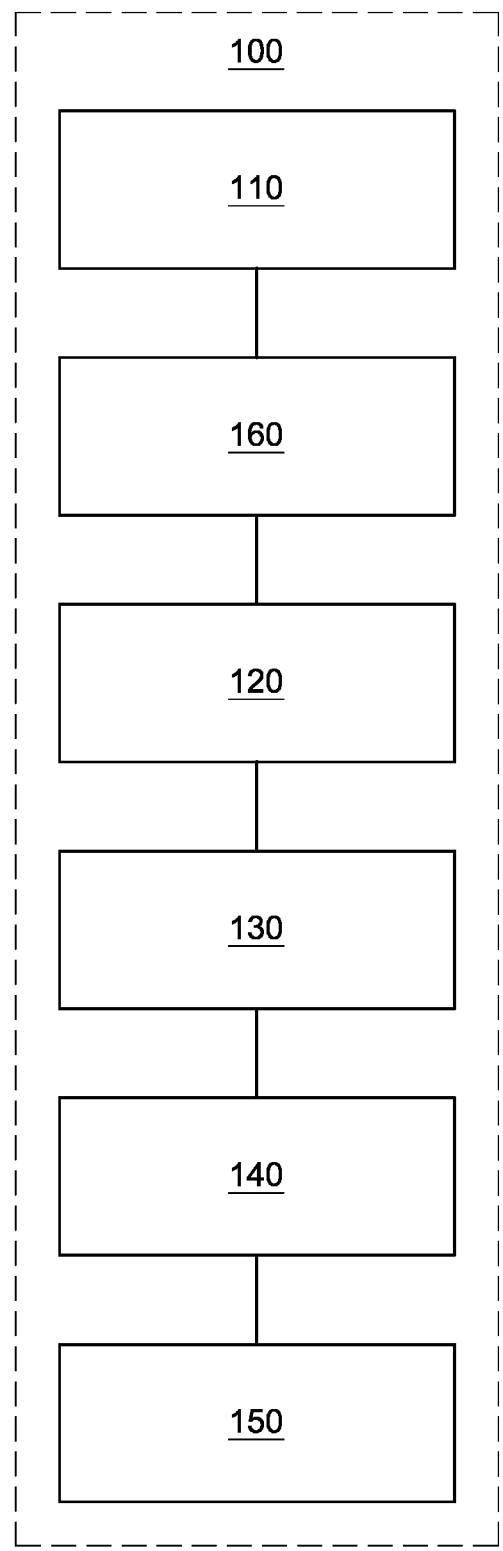
FIG. 2 illustrates an additional act of calibrating.

FIG. 2 illustrates an additional act of synchronising 160. The method 100 again relates to examples and implantations shown in FIGS. 4-6.

In view of the described method 100 illustrated in FIG. 1 the act of collecting datasets 110 is performed as timestamped data 32 and the method further comprising an act of synchronizing 160 the collected datasets 30 according to timestamps 34.

Synchronizing 160 may be performed by computational means 60. Synchronization 160 may be performed at sensor node 42 level. A timestamp 34 may be obtained from a local clock or from a global clock and applied to sampled data to generate timestamped data 32.

There is an act of classifying 150 the relative blade pitch angle alignment 102 between the pitch angles 104 of at least one combination of rotor blades 106 in the set of least two rotor blades 22.

Figure 3:
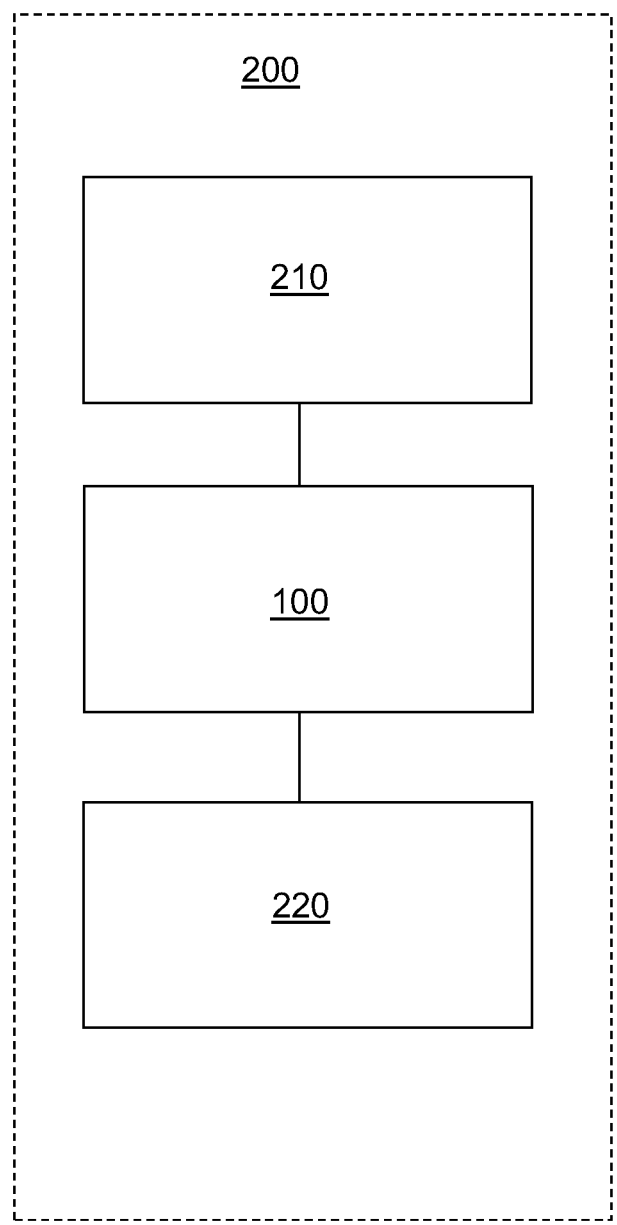
FIG. 3 illustrates a method of operating a rotary device involving relative pitch angle alignment.

FIG. 3 illustrates a method 200 of operating a rotary device 10 involving relative pitch angle alignment 102.

The method 200 of operating a rotary device 200 comprises the acts illustrated.

There is an act of providing 210 the rotary device 10.

There is an act of monitoring 100 relative blade pitch angle alignment 102 of the rotary device 10.

There is an act of operating 220 rotary device 10 as a function of the classified relative pitch angle alignment 102.

FIG. 4 illustrates definitions of relative pitch angles of a rotary device 10.

The rotary device 10 comprises a set of rotor blades 20. The set of rotor blades 20 comprises two rotor blades 22.

The rotary device 10 with four positions of the rotor blades 22 are disclosed in FIG. 4A, FIG. 4B, FIG. 4C and FIG. 4D.

Projections 10P of the rotary device 10 are shown for each of the four positions.

Each rotor blade 22 is positioned at a pitch angle ($\phi_i$ and $\phi_j$) 104. The pitch angles ($\phi_i$ and $\phi_j$) 104 are measured using a set of blade sensors 40 (not shown) on each rotor blade 22. The set of blade sensors 40 comprises on or more blade sensors 42.

A relative pitch angle alignment 102 is defined as a difference ($\Delta\phi_{ij}$) between the pitch angles ($\phi_i$ and $\phi_j$) 104 of the two rotor blades 22:

$$\Delta\phi_{ij}=\phi_i-\phi_j$$

The relative pitch angle alignment ($\Delta\phi_{ij}$) 102 is equal to zero if the pitch angles ($\phi_i$ and $\phi_j$) 104 of the two rotor blades 22 are equal.

The relative pitch angle alignment ($\Delta\phi_{ij}$) 102 is different from zero if the pitch angles ($\phi_i$ and $\phi_j$) 104 of the two rotor blades 22 are different from one another.

In FIG. 4A the pitch angles ($\phi_i$ and $\phi_j$) 104 are equal to zero and thus the relative pitch angle alignment ($\Delta\phi_{ij}$) 102 is equal to zero.

In FIG. 4B the pitch angles ($\phi_i$ and $\phi_j$) 104 are equal to each other ($\phi_i=\phi_j$) and thus the relative pitch angle alignment ($\Delta\phi_{ij}$) 102 is equal to zero.

In FIG. 4C the pitch angle ($\phi_i$) 104 is equal to zero and the pitch angle ($\phi_j$) 104 is different from zero and thus the relative pitch angle alignment ($\Delta\phi_{ij}$) 102 is different from zero.

In FIG. 4D the pitch angle ($\phi_i$) 104 is different from zero and the pitch angle ($\phi_j$) 104 is different from zero. The pitch angle ($\phi_i$) 104 is numerical larger than the pitch angle ($\phi_j$) 104 i.e. $\phi_i>\phi_j$. Thus the relative pitch angle alignment ($\Delta\phi_{ij}$) 102 is different from zero.

The principles apply to a combination of (two) rotor blades 106 (not shown) for rotary devices with three or n-rotor blades. In example a rotary device with three blades, (1,2,3) or (A, B, C) will have the combination of rotor blades 106 ij=(12, 13, 23), ij=(AB, AC, BC).

FIG. 5 illustrates a rotary device 10; in this case a wind turbine generator 12. The rotary device 10 comprises a rotor 14 with a set of rotor blades 20. The set of rotor blades 20 comprises three rotor blades 22A, 22B, 22C.

FIG. 6 illustrates a sensory arrangement on blades 22A, 22B, 22C of a rotary device 10.

The rotary device 10 is a wind turbine generator (WTG) 12 with a rotor 14. The blades 22A, 22B, 22C is a set of rotor blades 20. Each blade 22A, 22B, 22C comprises a set of blade sensors 40A, 40B, 40C. In the present case each set of blade sensors 40A, 40B, 40C comprises a blade sensor 42A, 42B, 42C.

A sensor 42 is configured to be in communication with a controller 62 or computational means 60. The communication may be wired or wireless as illustrated here.

The sensors 42 may be implanted as a sensor node comprising essential processing and configuration means.

Figure 7:
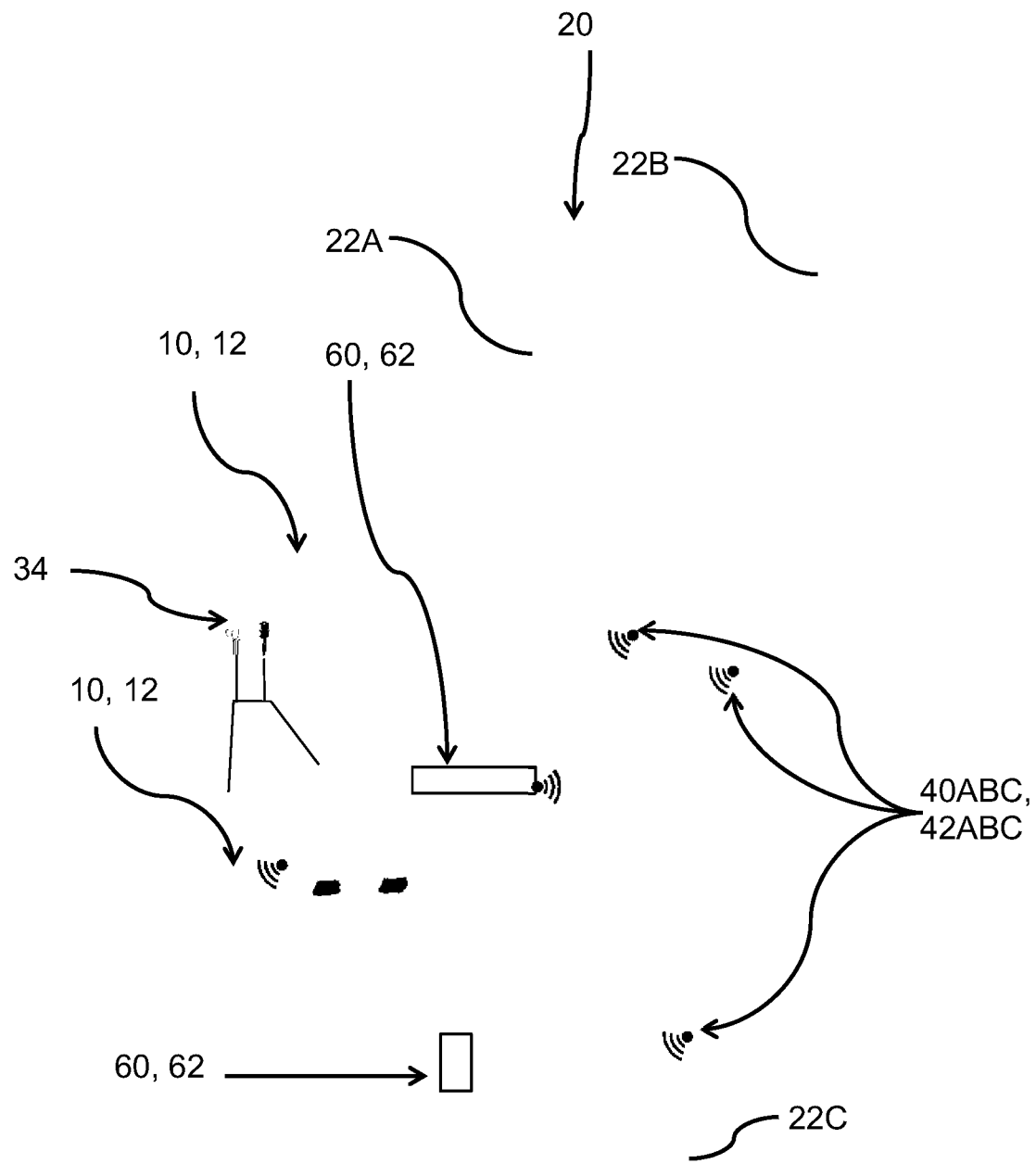
FIG. 7 illustrates further aspects of sensory arrangement on a rotary device.

FIG. 7 illustrates further aspects of sensory arrangement on a rotary device 10.

The rotary device 10 is a wind turbine generator (WTG) 12 with a rotor 14. The rotary device 10 comprises a set of rotor blades 20. The set of rotor blades 20 is three rotor blades 22A, 22B, 22C.

Each blade 22A, 22B, 22C comprises a set of blade sensors 40A, 40B, 40C. In the present case each set of blade sensors 40A, 40B, 40C comprises a blade sensor 42A, 42B, 42C.

A further sensor 42 is shown. In this embodiment, the further sensor is a rotary sensor (RPM-sensor or vibration sensor) such as a high sampling speed sensor measuring the rotational speed. The system may be configured for an act of calibrating 120 as shown in FIG. 1 and based on sensors 42ABC, that is performed against at least one other sensor 42 from the rotary device 10.

The computational means 60 or controller 62 may be a single unit or distributed as illustrated here.

Figure 8:
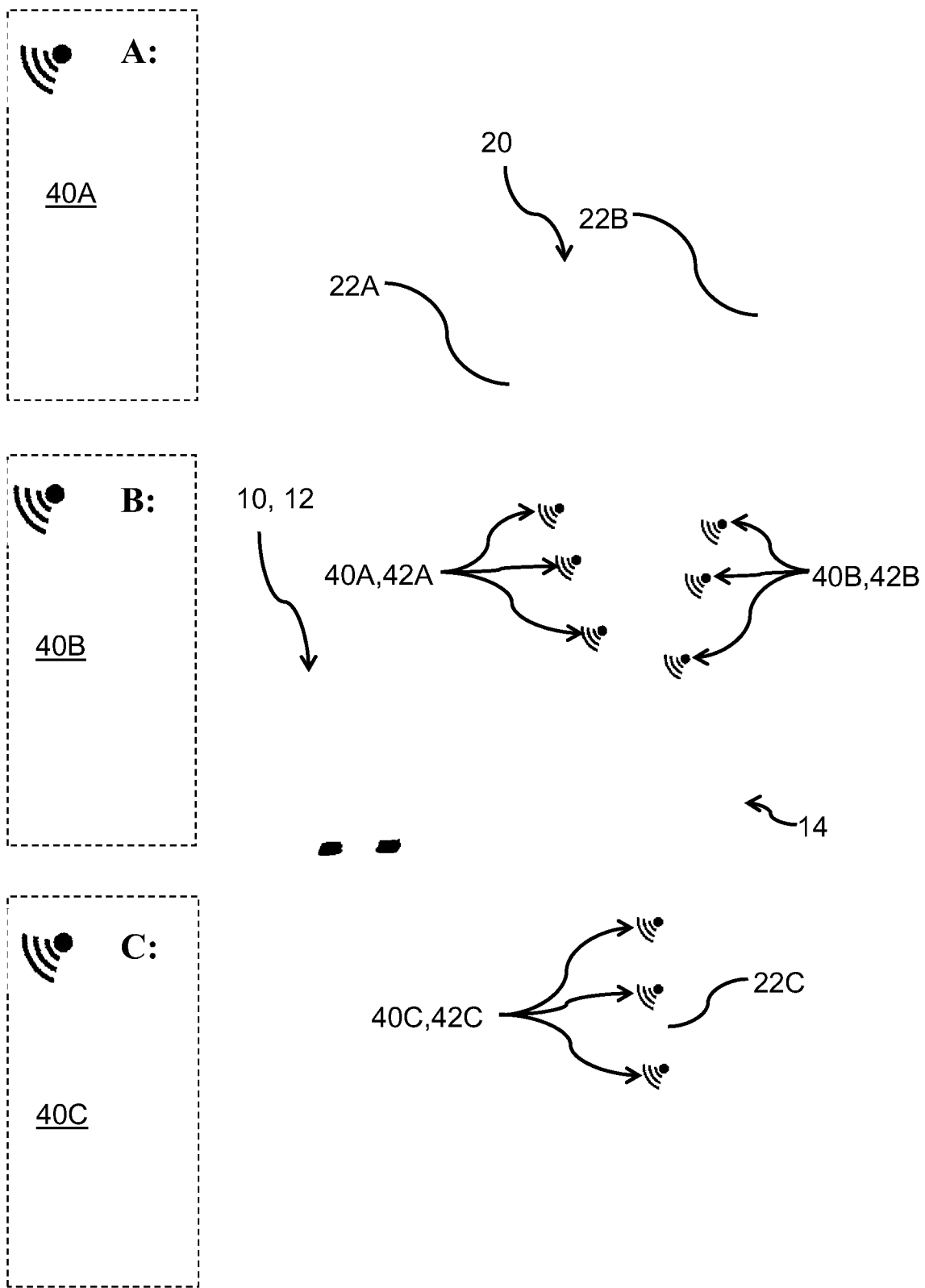
FIG. 8 illustrates multiple sensor node arrangement options and illustrates arrangements of sensors on blades.

FIG. 8 illustrates multiple sensor node arrangement options and illustrates arrangements of sensors 42A, 42B, 42C on blades 22A, 22B, 22C.

The figure illustrates a rotary device 10 being a wind turbine generator (WTG) 12 having a rotor 14.

The rotary device 10 comprises a set of rotor blades 20. The set of rotor blades 20 is three rotor blades 22A, 22B, 22C.

Each blade 22A, 22B, 22C comprises a set of blade sensors 40A, 40B, 40C. In the present case each set of blade sensors 40A, 40B, 40C comprises three blade sensors 42A, 42B, 42C.

A set of sensors 40 may be understood as a sensor node with one or more sensors 42.

Such sensor node may comprise processors or means to configure, collect, store and process sensor data generated. A sensor node may have communication means to communicate with a controller (not shown) or other sensor nodes. A sensor node may have means to synchronize 160 (as illustrated previously) say sensors 42A, 42B and 42C data.

Figure 9:
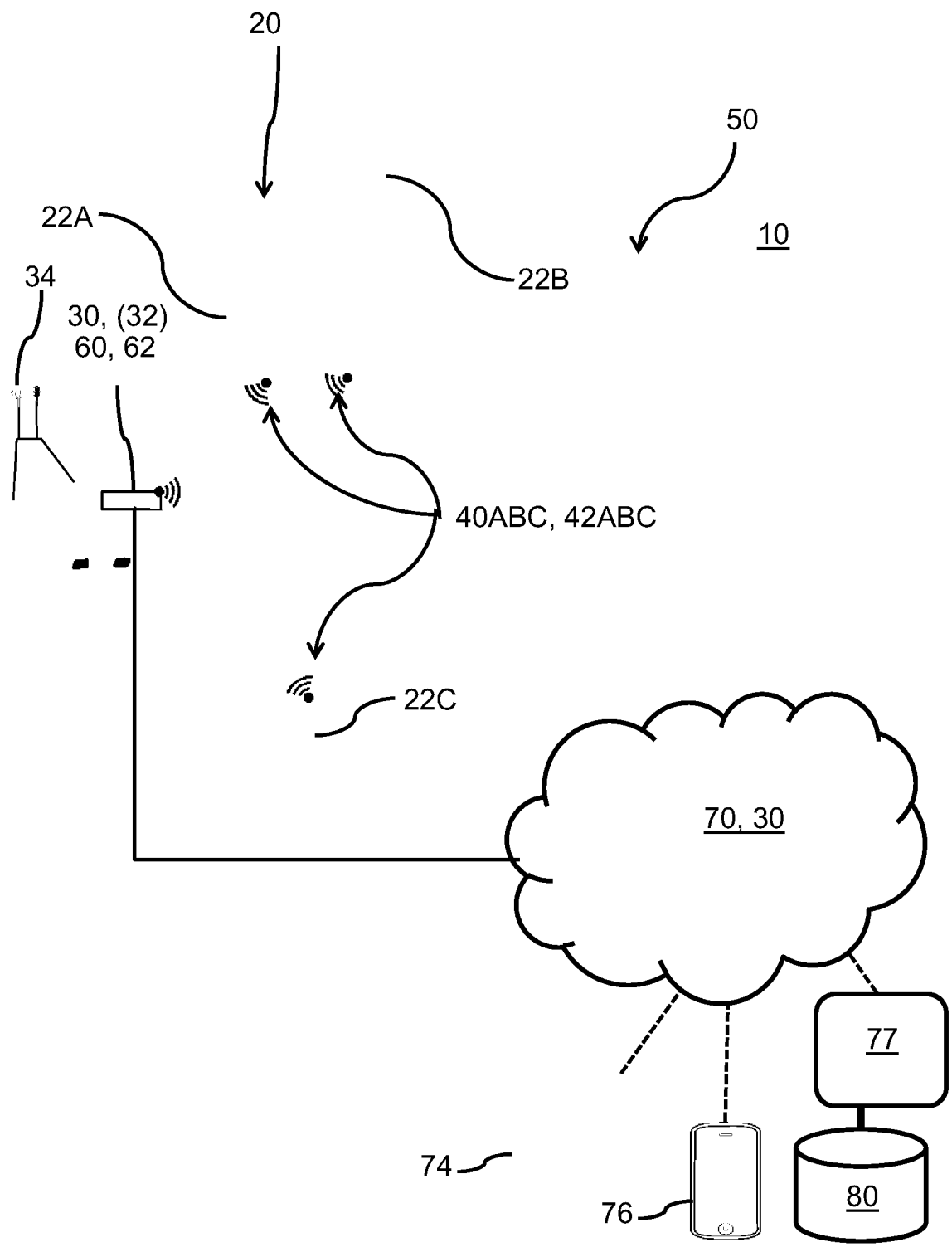
FIG. 9 illustrates a rotary device with relative blade pitch angle alignment in interaction with a remote/cloud based operating/monitoring system.

FIG. 9 illustrates a rotary device 10 with a blade pitch alignment monitoring system 50 with relative blade pitch angle alignment 102 (not shown) in interaction with a remote/cloud based operating/monitoring system 70.

The rotary device 10 is a wind turbine generator (WTG) 12 with a rotor 14. The

The rotary device 10 comprises a set of rotor blades 20. The set of rotor blades 20 is three rotor blades 22A, 22B, 22C.

Each blade 22A, 22B, 22C comprises a set of blade sensors 40A, 40B, 40C. In the present case each set of blade sensors 40A, 40B, 40C comprises a blade sensor 42A, 42B, 42C.

The data sets 30 are processed by computational means 60 in or by the wind turbine controller 62. The controller 62 may have a clock for generating a timestamp 34. In this case the time stamp is further synchronized and "delivered" from a global time server 34. Hence the datasets 30 may be timestamped data 32. Alternatively, each sensor node 42 may be synchronized and the timestamp 34 may be applied at sensor node level.

The system 50 may interact with a operator system 74, a mobile device 76, a client server 77 and a storage or database 80 via a cloud/connection 70 service. Further access or mirroring or monitoring may be available via the cloud 70 for long term monitoring, alerts or service programmes.

The methods and act disclosed herein 100 may be performed in a single processor device or be distributed.

Figure 10:
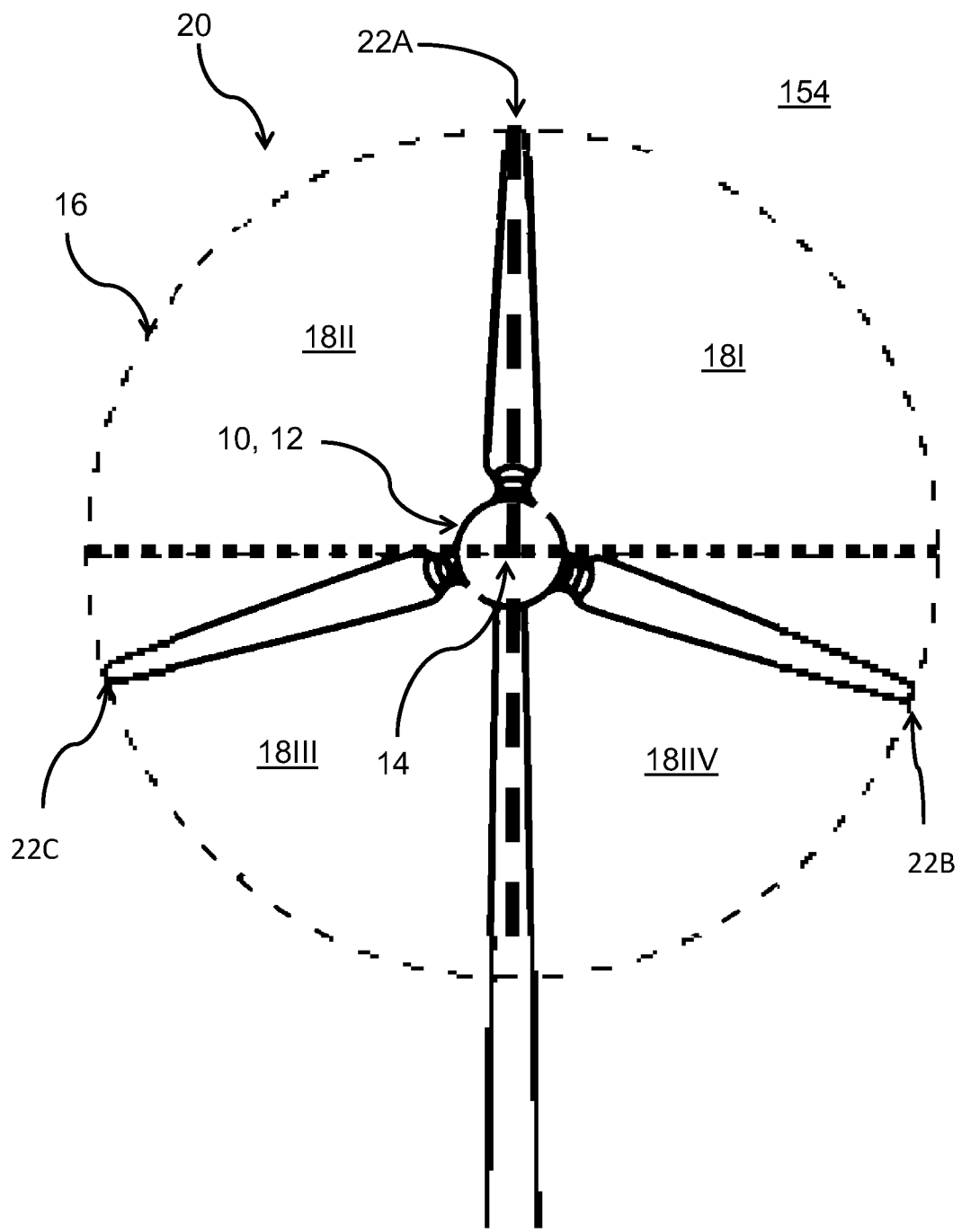
FIG. 10 illustrates aspects of aerodynamic efficiency in comparison to FIG. 11.

FIG. 10 illustrates aspects of relative aerodynamic efficiency 154 for different rotor sectors 18I-IV i.e. as a function of swept area 16. The swept area 16 is here divided in four sectors 18 by the dotted lines.

Figure 11:
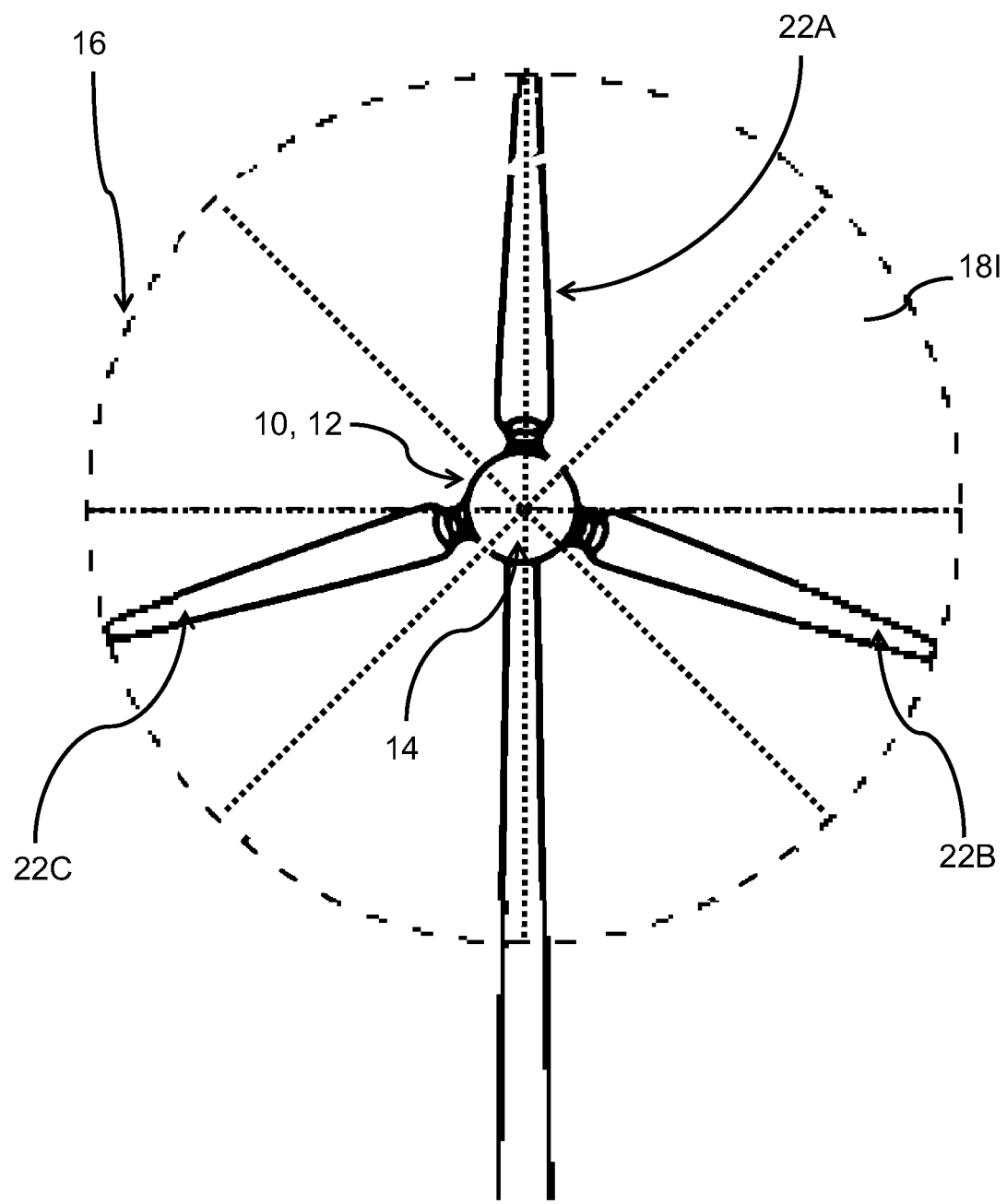
FIG. 11 illustrates a aspects of aerodynamic efficiency as a function of swept area.

In the FIG. 11 example, the swept area 16 by the rotor 14 is divided into eight equally sized sectors 18I-VIII, of each 45° by the four dotted lines—but any other division of the swept area 16 by the rotor 14 into equally sized sectors can be relevant. The relative difference in between the specific blade's 22 aerodynamic efficiency in a specific sector 18I of the swept area 16 by the rotor 14 can be monitored over time by comparing acceleration and triangular movements in rotor and in individual blades in the time period where this specific blade (2) is located/operating in this specific sector of the swept area.

Figure 12:
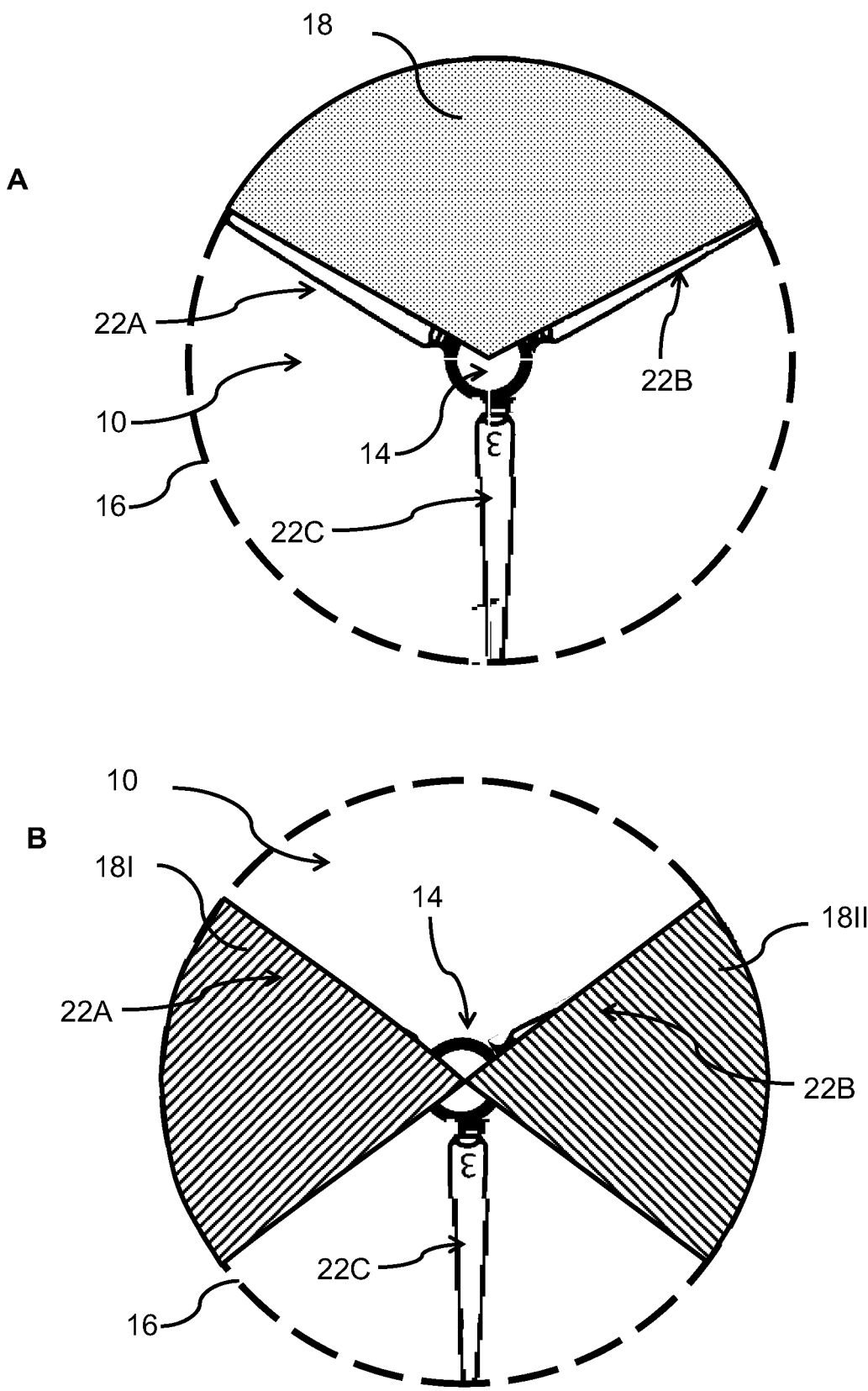
FIG. 12 illustrates sector based classification of aerodynamic efficiency.

FIGS. 12 A and B illustrates further classification of relative blade pitch monitoring and/or relative aerodynamic efficiency in different operational circumstances or sectors 18.

In 12A the monitoring of relative imbalance in blade aerodynamic efficiency which can be due to blade damage etc. Monitor over time and compare acceleration-, triangular movements in rotor and in individual blades each time while blade 22A, B and C is operating in dotted area or sector 18 of the swept area 16.

FIG. 12B illustrates monitoring asymmetry in a blocking zone in front of rotor 14. That is monitoring over time and comparing acceleration-, triangular movements in rotor 14 and in individual blades 22 each time while blade 22A (or B or C) is operating in/dashed area/sector 18I and in \-dashed area/sector 18II.

Figure 13A:
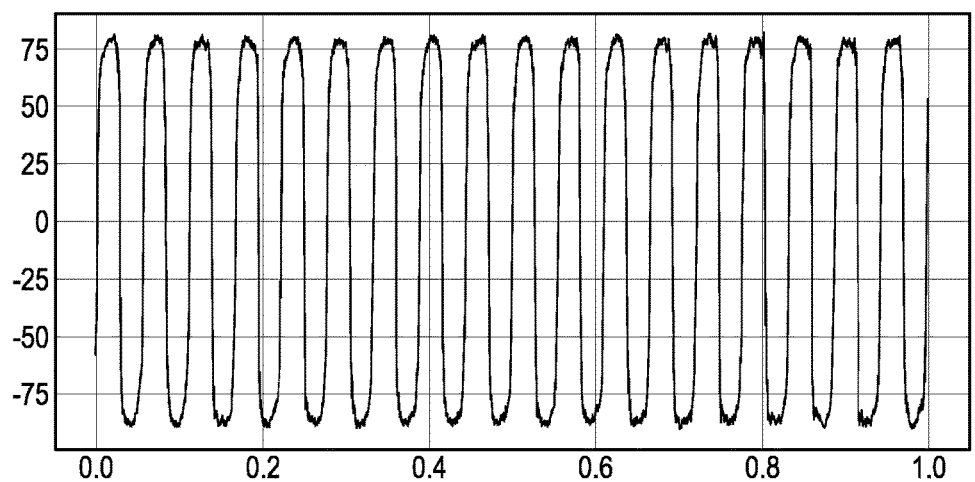
FIG. 13 illustrates an example of data analysis based on a "Roll"-type method.
Figure 13B:
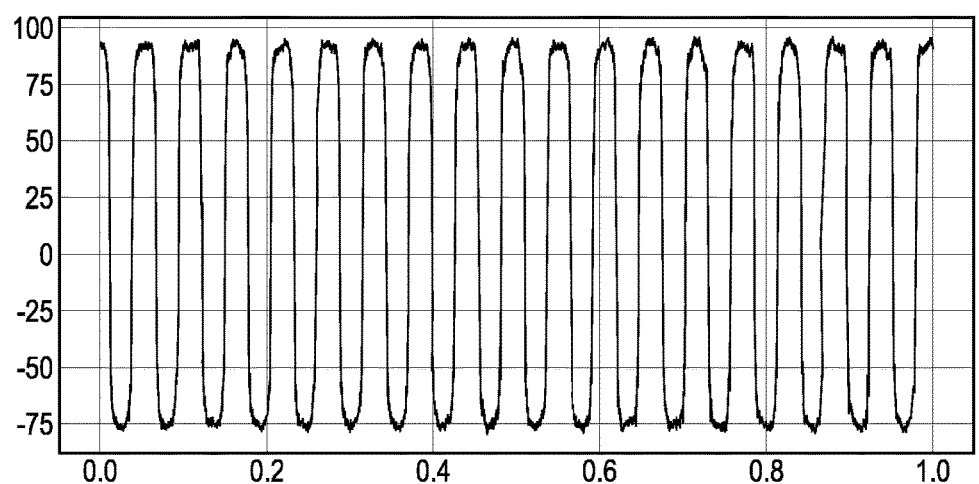
Figure 13C:
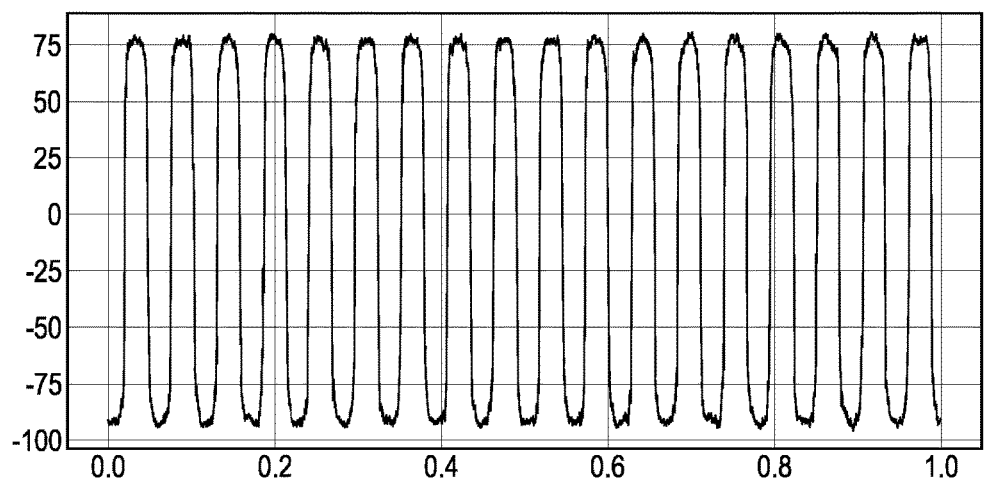
Figure 14A:
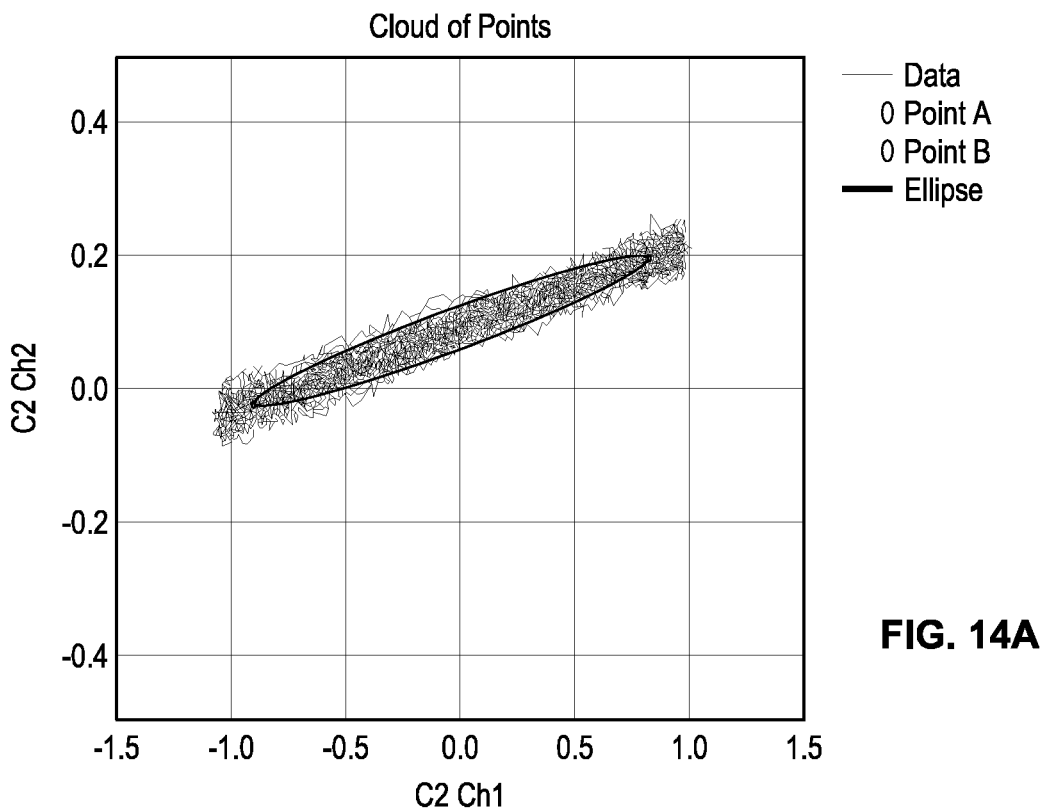
FIG. 14 illustrates an example of data analysis based on a "Fitting Ellipse" type of method.
Figure 14B:
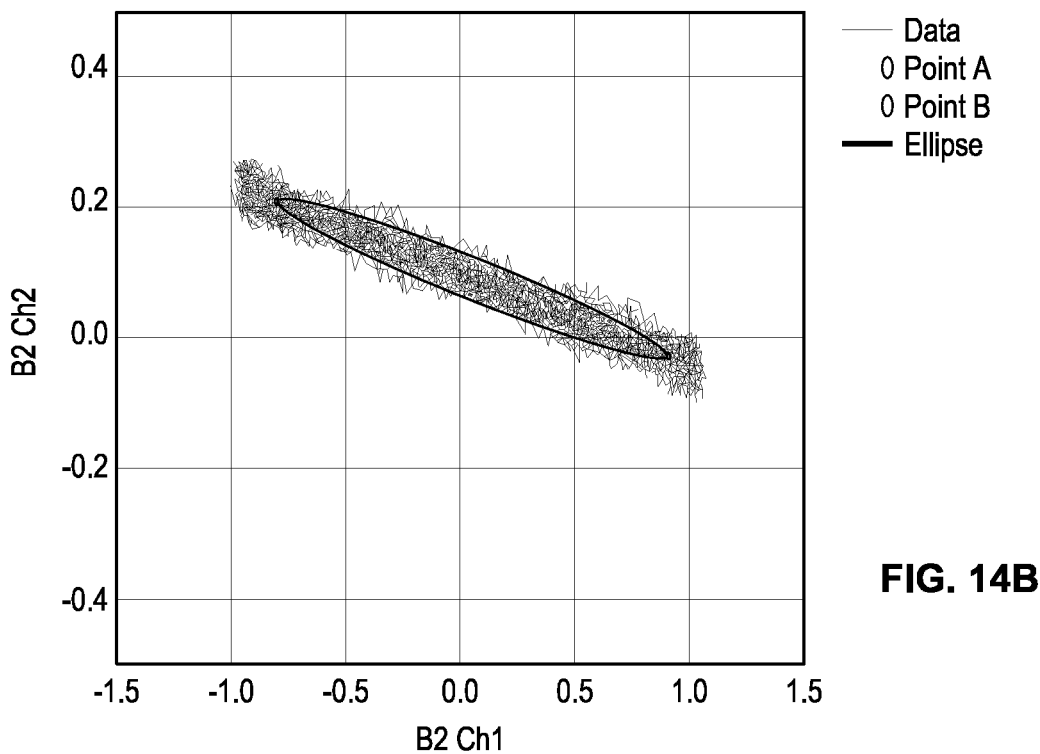
Figure 15:
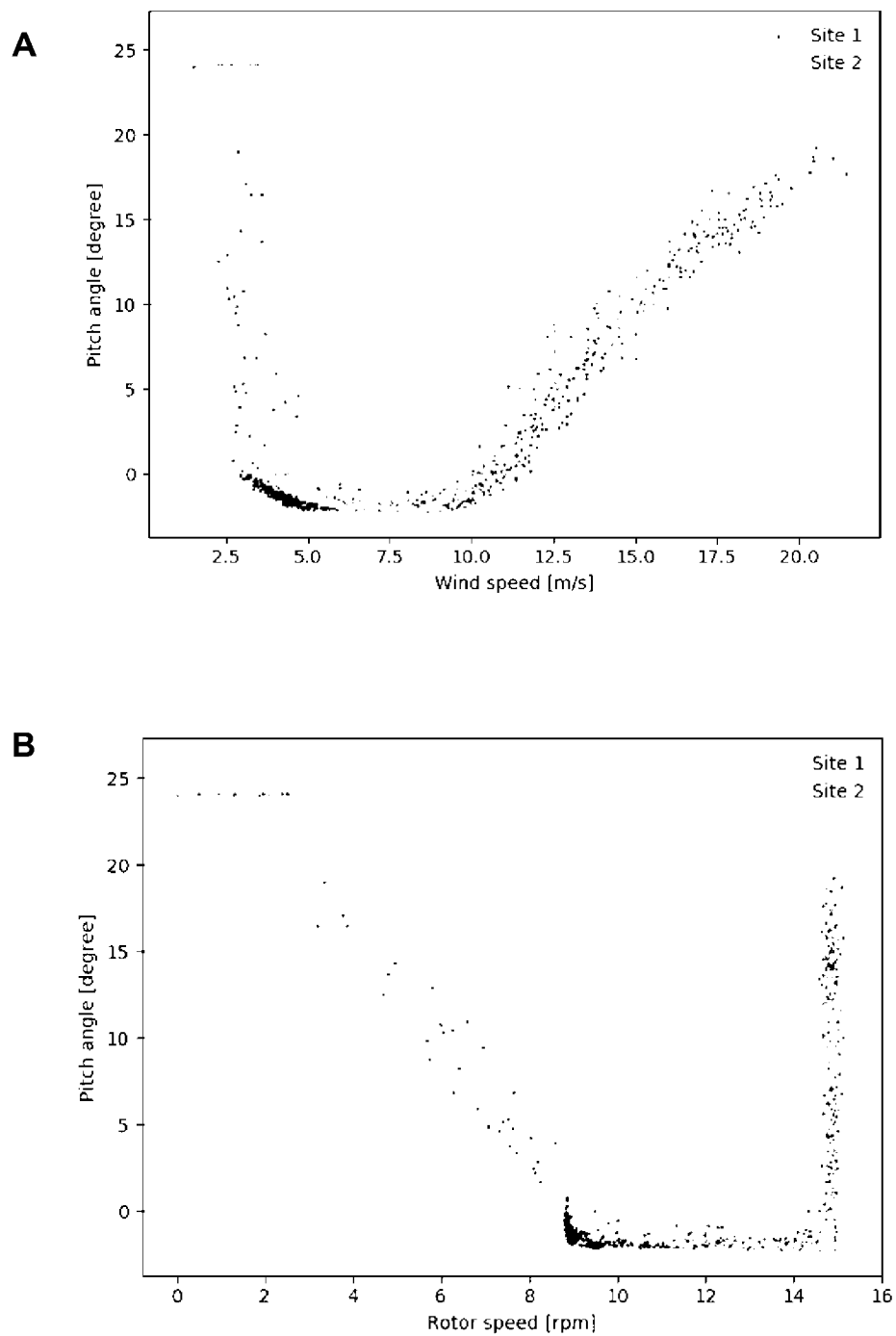
FIG. 15 illustrates aspects of aerodynamic blade efficiency with and without relative blade pitch angle alignment.
Figure 5:
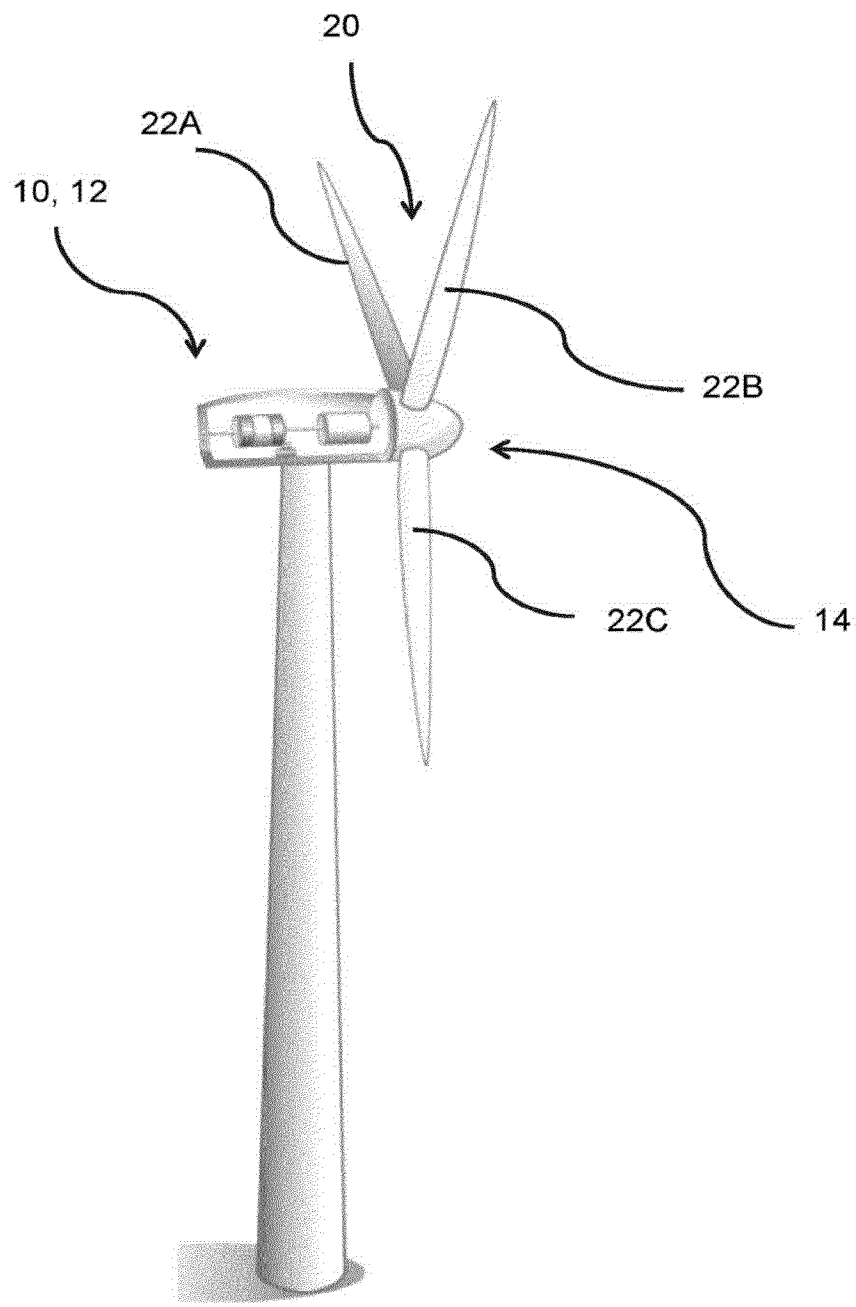
Figure 6:
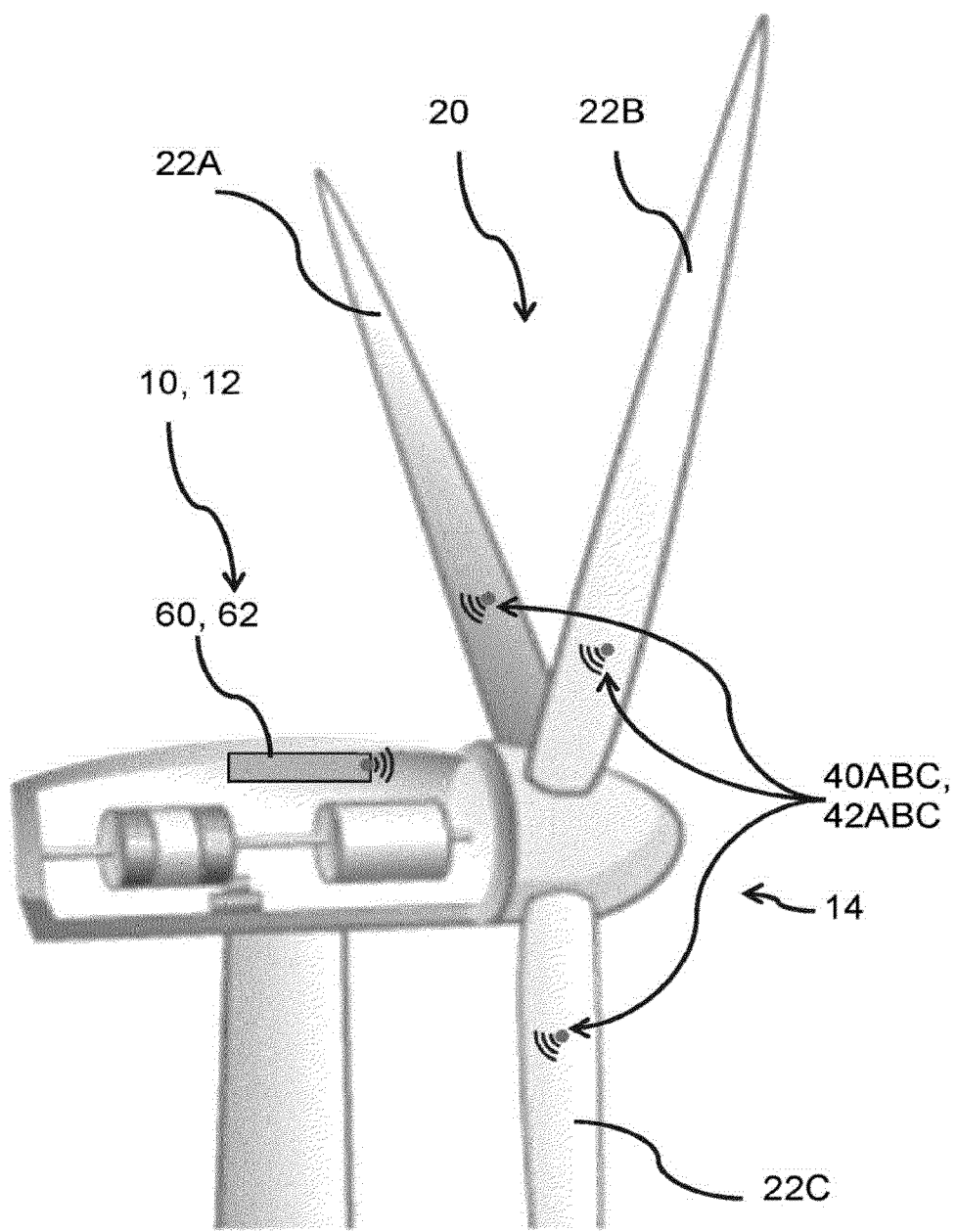
Figure 7:
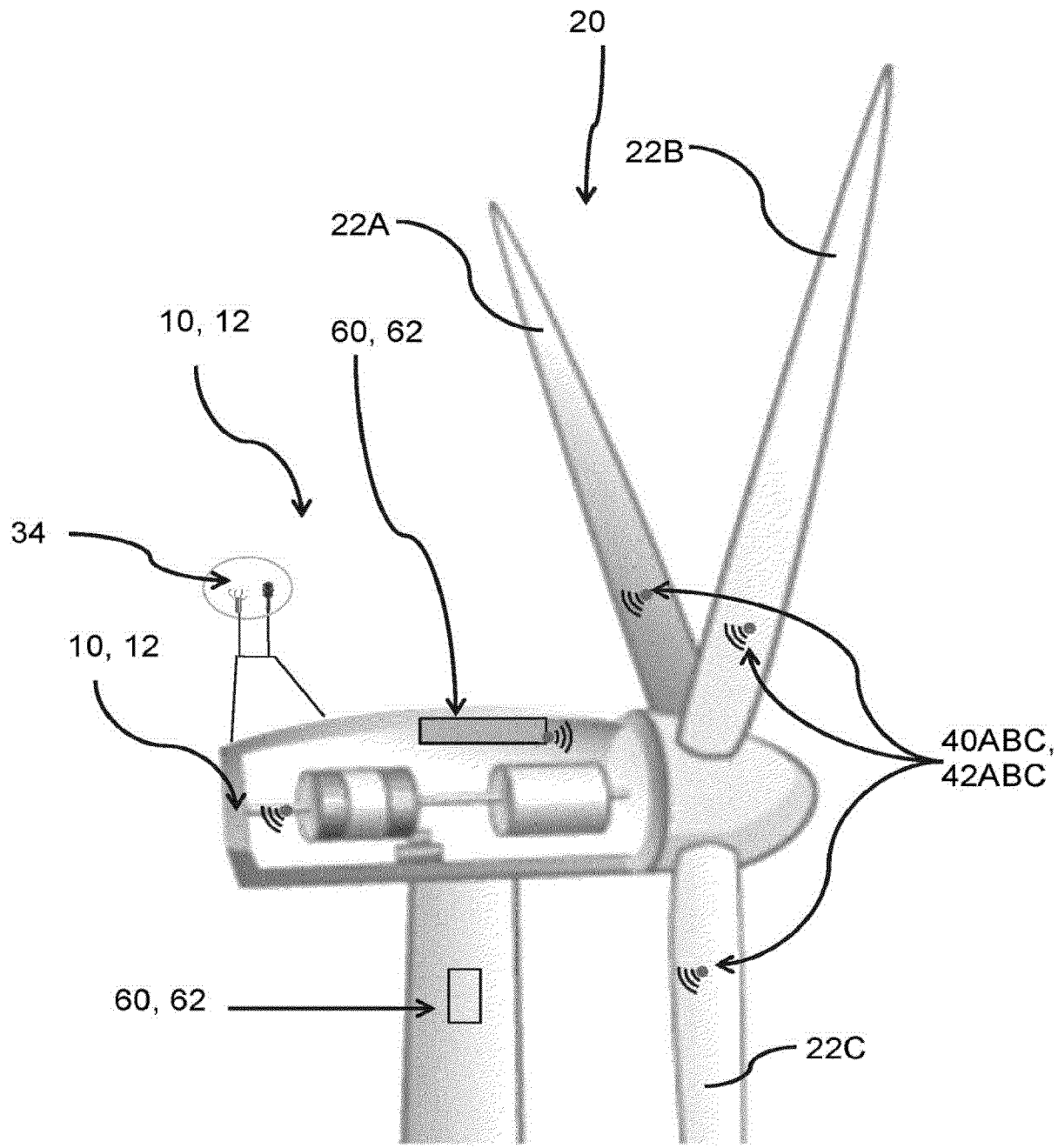
Figure 8:
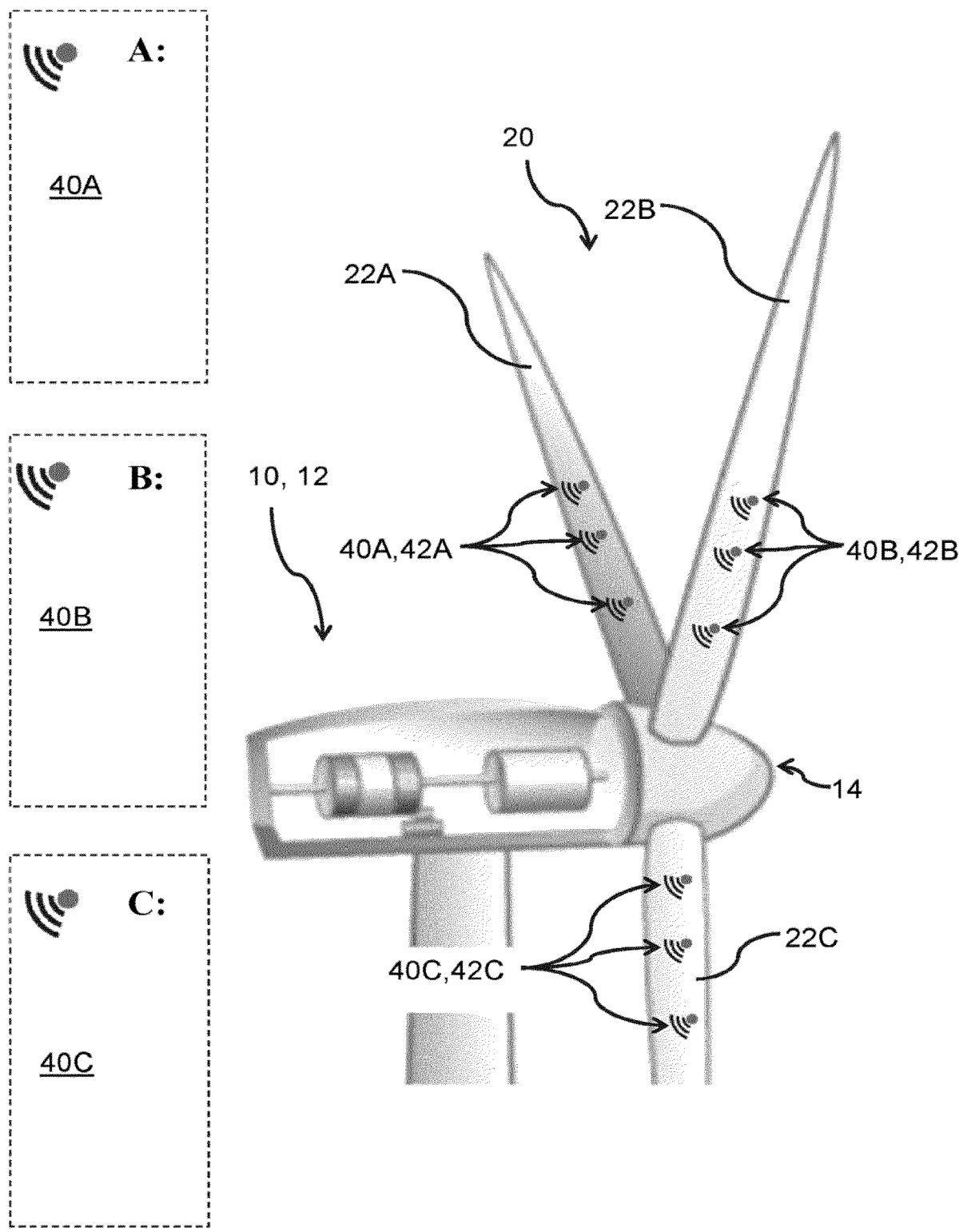
Figure 9:
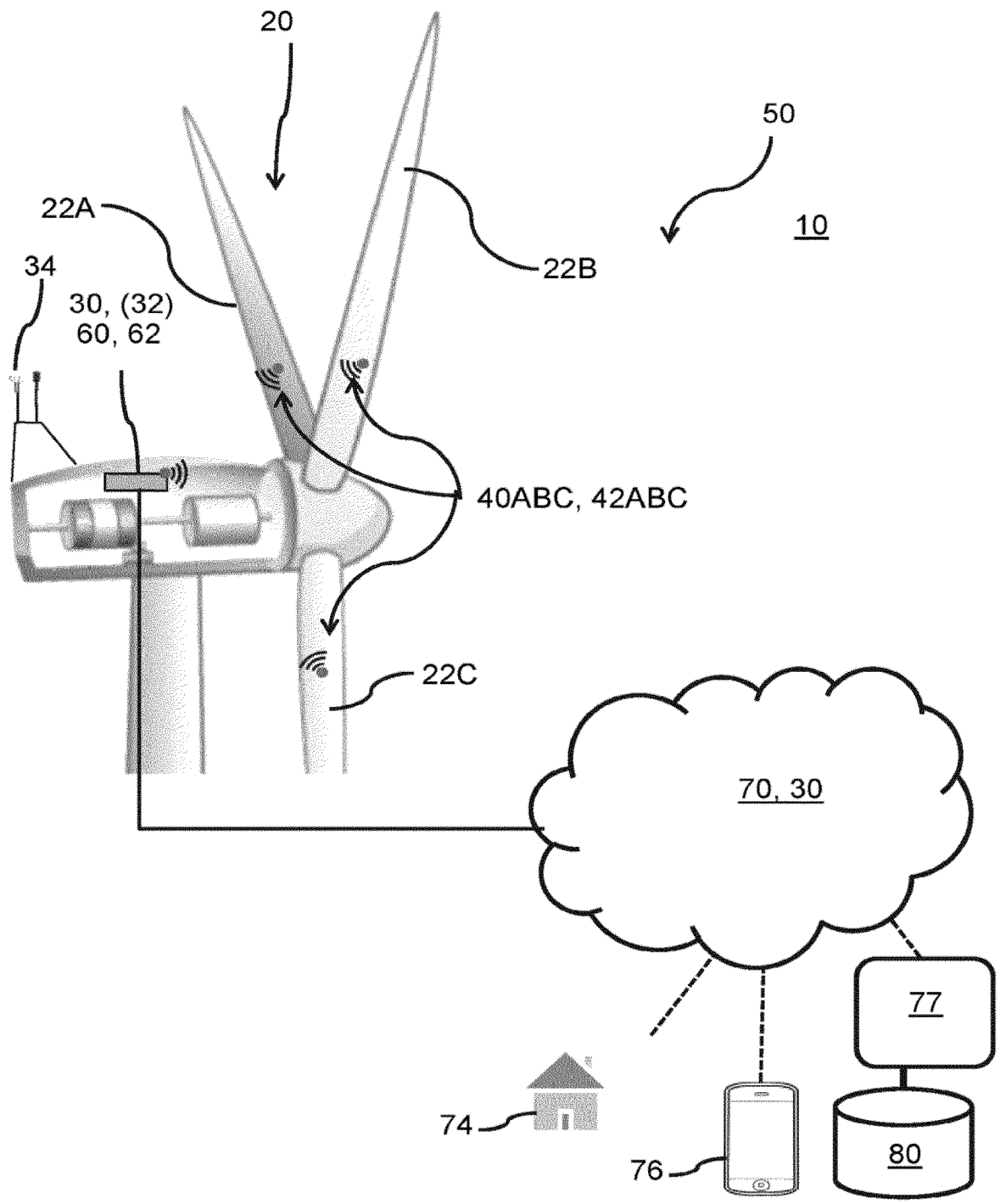

FIGS. 13 to 15 relate to the examples as described.

The invention claimed is:

1. A method of monitoring relative blade pitch angle alignment of a set of at least two rotor blades in a rotary device; the method comprising acts of:
   collecting one or more datasets from a set of one or more blade sensors of the at least two rotor blades, wherein the act of collecting datasets is performed as time-stamped data;
   synchronizing the collected datasets according to time-stamps;
   calibrating one blade sensor from one set of blade sensors against at least one blade sensor from another set of blade sensors;
   calculating a calibration correction factor for the blade sensors;
   applying the calibration correction factor to each respective datasets data sets; and
   classifying the relative blade pitch angle alignment between the pitch angle of at least one combination of rotor blades in the set of least two rotor blades.

2. The method of claim 1, wherein the acts of collecting and calibrating are performed with the rotary device in a static state, and wherein the act applying the static calibration correction factor is performed on relative dynamic blade pitch misalignment from the rotary device in a static state position compared to when the rotary device is in dynamic state.

3. The method of claim 1, wherein the act of calibrating is performed against at least one other sensor from the rotary device.

4. The method of claim 1, wherein the act of collecting is performed with blade sensors arranged substantially identical on the respective rotor blades.

5. The method of claim 1, wherein acts are performed on the rotary device including three rotor blades, and wherein the act of collecting is performed as:
   collecting a A-dataset during a time period where the rotary device is in the static-state with the rotor blade A in a predefined position P;
   collecting a B-dataset where the rotary device is in the static-state with the rotor blade B in the predefined position P; and
   collecting a C-dataset where the rotary device is in the static-state with the rotor blade C in a predefined position P.

6. The method of claim 5, wherein the act of calibrating is performed only based on collected data sets A-, B-, and C-datasets.

7. The method of claim 1, wherein the act of classifying is performed in different states of rotary device operational states including at least the states of:
   the static-state; or
   the dynamic-state.

8. The method of claim 1, wherein the act of classifying is performed at various rotational speeds of the rotary device.

9. The method according to claim 1, wherein the rotary device is a rotor of a wind turbine generator and the rotor blades are blades of the wind turbine generator.

10. The method according to claim 9, further including acts of monitoring and classifying aerodynamic efficiency and to classify into relative blade aerodynamic efficiencies between at least one combination in the set of at least two rotor blades.

11. A method of operating a rotary device including the acts of:
   providing the rotary device;
   monitoring relative blade pitch angle alignment of the rotary device according to claim 1; and
   operating the rotary device as a function of the classified relative pitch angle alignment.

12. The method of claim 11, wherein the rotary device is a wind turbine generator and wherein the act of operating the rotary device is performed in a corrected mode of operation if the monitored relative blade pitch angle alignment is at or above a threshold value.

13. The method of claim 12, wherein the act of monitoring and classifying further include acts of monitoring and classifying relative differences in blade aerodynamic efficiencies between at least one combination in the set of at least two rotor blades; and
   wherein the act of operating further includes operating the rotary device as a function of the classified relative aerodynamic efficiency.

14. A blade pitch angle alignment monitoring system comprising:
- a set of one or more blade sensors; and
- computational means configured to perform the acts of claim 1.

* * * * *

UNITED STATES PATENT AND TRADEMARK OFFICE
CERTIFICATE OF CORRECTION

PATENT NO. : 11,976,630 B2
APPLICATION NO. : 17/438403
DATED : May 7, 2024
INVENTOR(S) : Poul Anker Skaarup Lübker, Shavkat Mingaliev and Xavier Tolron It is certified that error appears in the above-identified patent and that said Letters Patent is hereby corrected as shown below:

In the Drawings

Replace Figs. 5-9 with Figs. 5-9 as shown on attached drawing sheets.

Signed and Sealed this
Fifth Day of November, 2024

Katherine Kelly Vidal
*Director of the United States Patent and Trademark Office*